US012670878B2

(12) United States Patent
Hirai et al.

(10) Patent No.: US 12,670,878 B2
(45) Date of Patent: Jun. 30, 2026

(54) LIQUID CRYSTAL DISPLAY DEVICE FOR IMPROVING COLORATION BETWEEN PRIVACY AND PUBLIC MODES

(71) Applicant: Sharp Display Technology Corporation, Kameyama City (JP)

(72) Inventors: Akira Hirai, Kameyama City (JP); Koji Murata, Kameyama City (JP); Takashi Satoh, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 24 days.

(21) Appl. No.: 18/737,926

(22) Filed: Jun. 7, 2024

(65) Prior Publication Data

US 2024/0420657 A1 Dec. 19, 2024

(30) Foreign Application Priority Data

Jun. 15, 2023 (JP) ................................ 2023-098584

(51) Int. Cl.
*G09G 3/36* (2006.01)

(52) U.S. Cl.
CPC ... *G09G 3/3607* (2013.01); *G09G 2300/0426* (2013.01); *G09G 2320/0673* (2013.01); *G09G 2320/068* (2013.01)

(58) Field of Classification Search
None
See application file for complete search history.

(56) References Cited

U.S. PATENT DOCUMENTS

2005/0276088 A1* 12/2005 Moon .................. G09G 3/3648 365/63
2016/0247296 A1* 8/2016 Chen .................... G09G 3/3659
(Continued)

FOREIGN PATENT DOCUMENTS

JP 2021-067852 A 4/2021

*Primary Examiner* — Benjamin C Lee
*Assistant Examiner* — Emily J Frank
(74) *Attorney, Agent, or Firm* — ScienBiziP, P.C.

(57) ABSTRACT

A liquid crystal display device comprises a liquid crystal panel and a control unit configured to drive the liquid crystal panel, wherein the liquid crystal panel includes a first substrate, a liquid crystal layer, and a second substrate, all of which are provided in a stated order, the first substrate includes a first electrode and a second electrode either stacked via a first insulating layer or disposed opposite each other, the second substrate includes a third electrode, the control unit includes a display mode switching unit, a gamma correction table memory unit, a gamma correction unit, and an image data output unit, the display mode switching unit switches between narrow viewing angle mode and wide viewing angle mode by controlling a voltage applied to the third electrode, the gamma correction table memory unit contains gamma correction tables by each of which a gray level is associated with an application voltage to the first electrode and/or the second electrode, the gamma correction unit acquires different gamma correction tables from the gamma correction table memory unit for the narrow viewing angle mode and for the wide viewing angle mode, performs gamma correction on original image data based on each of the gamma correction tables, and outputs resultant gamma-corrected image data to the image data output unit, and the image data output unit outputs a liquid crystal panel drive signal to the liquid crystal panel and adjusts the application voltage to the first electrode and/or the second electrode.

4 Claims, 13 Drawing Sheets

(56) References Cited

U.S. PATENT DOCUMENTS

| | | | | |
|---|---|---|---|---|
| 2016/0335945 | A1* | 11/2016 | Kang | G09G 3/3607 |
| 2017/0229075 | A1* | 8/2017 | Zhu | G09G 3/3607 |
| 2018/0190729 | A1* | 7/2018 | Chu-Ke | G09G 3/3607 |
| 2019/0251920 | A1* | 8/2019 | Kim | G09G 3/3648 |
| 2021/0124223 | A1 | 4/2021 | Murata et al. | |
| 2021/0223584 | A1* | 7/2021 | Fan | G02F 1/134309 |

* cited by examiner

LIQUID CRYSTAL DISPLAY DEVICE FOR IMPROVING COLORATION BETWEEN PRIVACY AND PUBLIC MODES

CROSS-REFERENCE TO RELATED APPLICATIONS

This application claims the benefit of priority to Japanese Patent Application Number 2023-098584 filed on Jun. 15, 2023. The entire contents of the above-identified application are hereby incorporated by reference.

TECHNICAL FIELD

The present disclosure relates to liquid crystal display devices.

BACKGROUND ART

A liquid crystal display device is a display device that utilizes a liquid crystal composition for display and typically produces a display by applying a voltage to a liquid crystal composition enclosed between a pair of substrates and changing the alignment of liquid crystal molecules in the liquid crystal composition in accordance with the applied voltage, to control the transmission of light. Such liquid crystal display devices are used in a wide variety of fields by taking advantage of their features such as small thickness, light weight, and low power consumption.

Conventionally, it has been studied to improve the viewing angle characteristics of a liquid crystal display device so that the same image can be observed in both a narrow viewing angle range and a wide viewing angle range. On the other hand, from a viewpoint of privacy protection, a display method has been studied by which images are observable in a narrow viewing angle range, but the images are difficult to observe in a wide viewing angle range. For example, Japanese Unexamined Patent Application Publication No. 2021-67852 discloses a liquid crystal display device that can switch between narrow viewing angle mode and wide viewing angle mode by controlling the voltage applied to a third electrode provided on a color filter substrate.

SUMMARY

Problems to be Solved

According to the study by the inventors of the disclosure, when the liquid crystal display device is switched between the public mode and the privacy mode by applying a voltage to the third electrode disposed on the opposite substrate side, for example, the front luminance and coloration of the liquid crystal panel could differ between the public mode and the privacy mode.

The disclosure has been made in view of these issues and has an object to provide a liquid crystal display device that is capable of switching between the privacy mode and the public mode and also of restraining changes in luminance and coloration of the liquid crystal panel between the privacy mode and the public mode.

Solution to the Problems (1) The disclosure, in an embodiment thereof, is directed to a liquid crystal display device including: a liquid crystal panel; and a control unit configured to drive the liquid crystal panel, wherein the liquid crystal panel includes a first substrate, a liquid crystal layer, and a second substrate, all of which are provided in a stated order, the first substrate includes a first electrode and a second electrode either stacked via a first insulating layer or disposed opposite each other, the second substrate includes a third electrode, the control unit includes a display mode switching unit, a gamma correction table memory unit, a gamma correction unit, and an image data output unit, the display mode switching unit switches between narrow viewing angle mode and wide viewing angle mode by controlling a voltage applied to the third electrode, the gamma correction table memory unit contains gamma correction tables by each of which a gray level is associated with an application voltage to the first electrode and/or the second electrode, the gamma correction unit acquires different gamma correction tables from the gamma correction table memory unit for the narrow viewing angle mode and for the wide viewing angle mode, performs gamma correction on original image data based on each of the gamma correction tables, and outputs resultant gamma-corrected image data to the image data output unit, and the image data output unit outputs a liquid crystal panel drive signal to the liquid crystal panel and adjusts the application voltage to the first electrode and/or the second electrode.

(2) In another embodiment of the disclosure, the liquid crystal display device of configuration (1) is further configured such that one of the gamma correction tables that is used in the narrow viewing angle mode contains a gamma value, and another one of the gamma correction tables that is used in the wide viewing angle mode contains a gamma value, the former gamma value being different from the latter gamma value by less than or equal to 0.4.

(3) In yet another embodiment of the disclosure, the liquid crystal display device of configuration (1) or (2) is further configured such that one of the gamma correction tables that is used in the narrow viewing angle mode contains a gamma value, and another one of the gamma correction tables that is used in the wide viewing angle mode contains a gamma value, the former gamma value being smaller than the latter gamma value.

(4) In still another embodiment of the disclosure, the liquid crystal display device of any of configurations (1) to (3) is further configured such that the gamma correction table memory unit contains a gamma correction table containing a gamma value that is constant between gray levels 0 to 255.

(5) In yet still another embodiment of the disclosure, the liquid crystal display device of any of configurations (1) to (3) is further configured such that the gamma correction table memory unit contains a gamma correction table containing a gamma value that has a plurality of values between gray levels 0 to 255.

(6) In a further embodiment of the disclosure, the liquid crystal display device of configuration (4) or (5) is further configured such that one of the gamma correction tables that is used in the wide viewing angle mode contains a gamma value that is constant between gray levels 0 to 255, and another one of the gamma correction tables that is used in the narrow viewing angle mode contains a gamma value that has a plurality of values between gray levels 0 to 255.

(7) In yet a further embodiment of the disclosure, the liquid crystal display device of configuration (6) is further configured such that letting gray level X be an arbitrary gray level between gray levels 0 to 255, the gamma value in the gamma correction table used in the narrow viewing angle mode is smaller than the gamma value in the gamma correction table used in the wide viewing angle mode at gray levels from 0 inclusive to X exclusive, and the gamma value in the gamma correction table used in the narrow viewing angle mode is greater than the gamma value in the gamma correction table used in the wide viewing angle mode at gray levels from X to 255 both inclusive.

(8) In still a further embodiment of the disclosure, the liquid crystal display device of configuration (6) is further configured such that letting X be an arbitrary gray level from gray levels 0 to 255, and Y be an arbitrary gray level higher than X, the gamma value in the gamma correction table used in the narrow viewing angle mode is smaller than the gamma value in the gamma correction table used in the wide viewing angle mode at gray levels from 0 inclusive to X exclusive, and the gamma value in the gamma correction table used in the narrow viewing angle mode is greater than the gamma value in the gamma correction table used in the wide viewing angle mode at gray levels from Y to 255 both inclusive.

(9) In yet still a further embodiment of the disclosure, the liquid crystal display device of any of configurations (1) to (8) is further configured such that either one or both of the first electrode and the second electrode is (are) provided in each picture element and include(s) a linear electrode section extending in a first direction, and the third electrode includes a linear electrode section extending in a second direction that intersects with the first direction in a plan view.

Advantageous Effects

The disclosure can provide a liquid crystal display device that is capable of switching between the privacy mode and the public mode and also of restraining changes in luminance and coloration of the liquid crystal panel between the privacy mode and the public mode.

DESCRIPTION OF EMBODIMENTS

Figure 1:
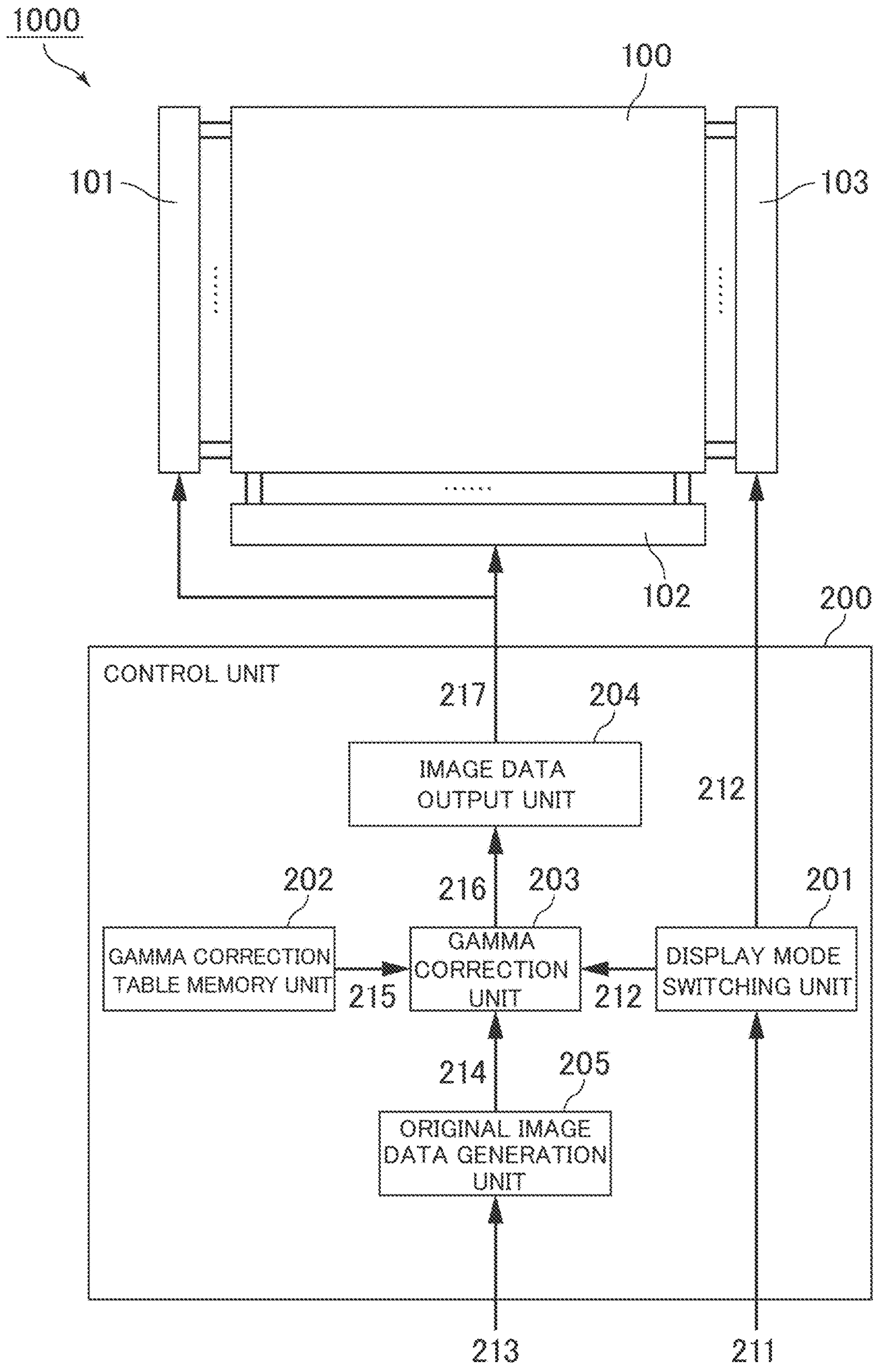
FIG. 1 is a block diagram representing an exemplary display method for a liquid crystal display device in accordance with an embodiment.

The following will describe embodiments of the disclosure. The disclosure is not limited to the contents described in the following embodiments, and design changes can be appropriately made within a range satisfying the configuration of the disclosure. Note that in the following description, the same portions or portions having similar functions are denoted by the same reference numerals in different drawings as appropriate, and description thereof is not repeated as appropriate. The aspects of the disclosure may be appropriately combined without departing from the scope of the disclosure.

In the present specification, a side closer to a screen (display surface) of a liquid crystal display device is also referred to as a "viewer side (front side)," and a side farther from the screen (display surface) of the liquid crystal display device is also referred to as a "rear side." The case of observing from the normal direction of the front side is also referred to as a "plan view."

In the present specification, the term, "horizontal," indicates that the liquid crystal molecules have a tilt angle (including a pretilt angle) of from 0° to 5°, preferably from 0° to 3°, and more preferably from 0° to 1°, relative to the surface of a first substrate 10 or a second substrate 30. The tilt angle of liquid crystal molecules refers to the angle by which the major axis of the liquid crystal molecules is inclined to the surface of the first substrate 10.

Embodiment 1

A liquid crystal display device in accordance with Embodiment 1 includes a liquid crystal panel and a control unit for driving the liquid crystal panel. The liquid crystal panel includes a first substrate, a liquid crystal layer, and a second substrate, all of which are provided in this order. The first substrate includes either a first electrode and a second electrode stacked via a first insulating layer or a first electrode and a second electrode disposed opposite each other. The second substrate includes a third electrode. The control unit includes a display mode switching unit, a gamma correction table memory unit, a gamma correction unit, and an image data output unit. The display mode switching unit switches between narrow viewing angle mode and wide viewing angle mode by controlling a voltage applied to the third electrode. The gamma correction table memory unit stores a gamma correction table associating a gray level with a voltage applied to the first electrode and/or the second electrode. The gamma correction unit acquires a gamma correction table for narrow viewing angle mode and a different gamma correction table for wide viewing angle mode from the gamma correction table memory unit, performs gamma correction on original image data on the basis of both gamma correction tables, and outputs the obtained gamma-corrected image data to the image data output unit. The image data output unit outputs a liquid crystal panel drive signal to the liquid crystal panel to adjust the voltage applied to the first electrode and/or the second electrode.

FIG. 1 is a block diagram representing an exemplary display method for a liquid crystal display device in accordance with an embodiment. Referring to FIG. 1, a liquid crystal display device 1000 in accordance with Embodiment 1 includes a liquid crystal panel 100 and a control unit 200 for driving a liquid crystal panel.

Liquid Crystal Panel

Figure 2:
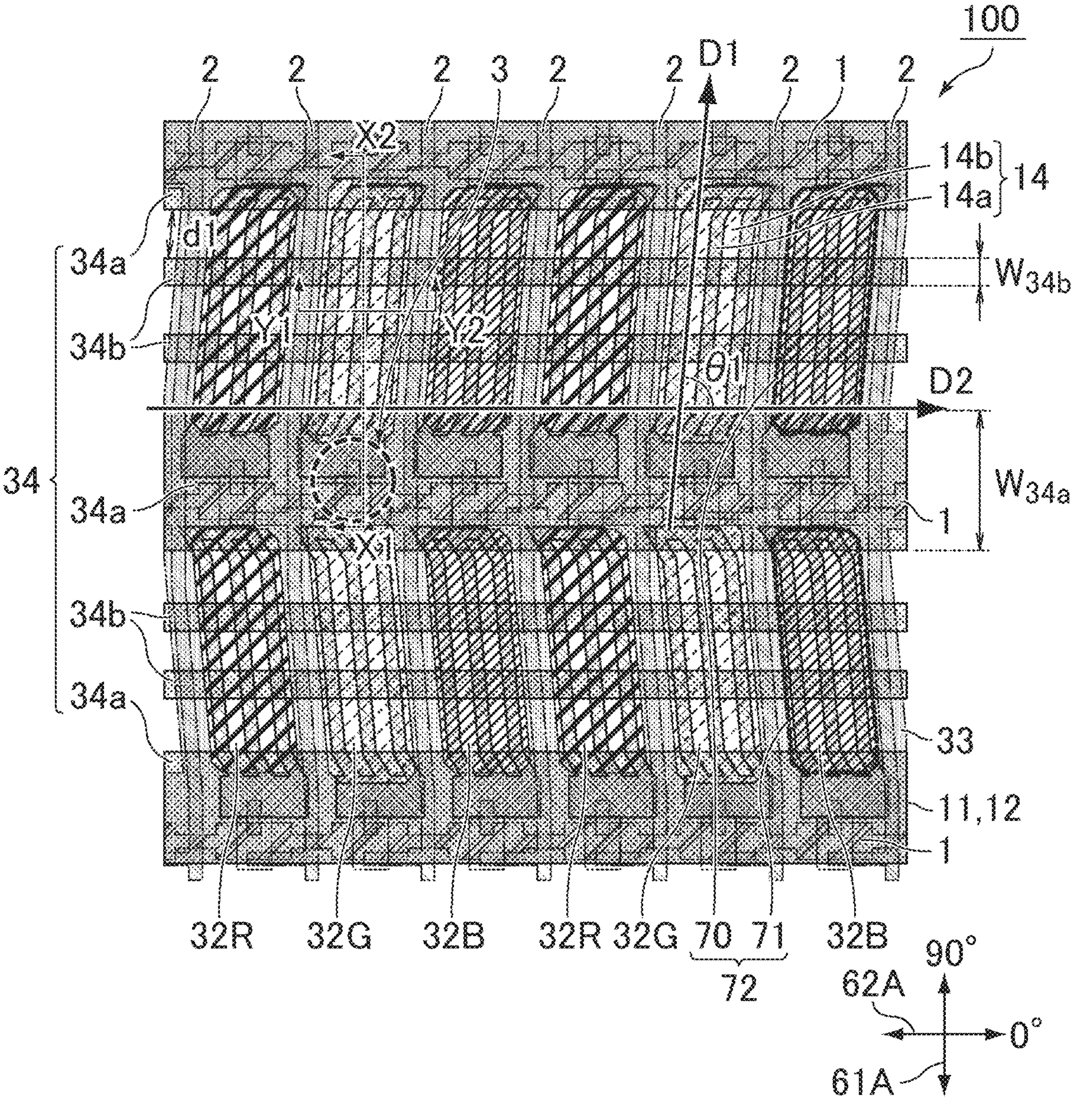
FIG. 2 is a schematic plan view of an exemplary liquid crystal display device in accordance with Embodiment 1.
Figure 3:
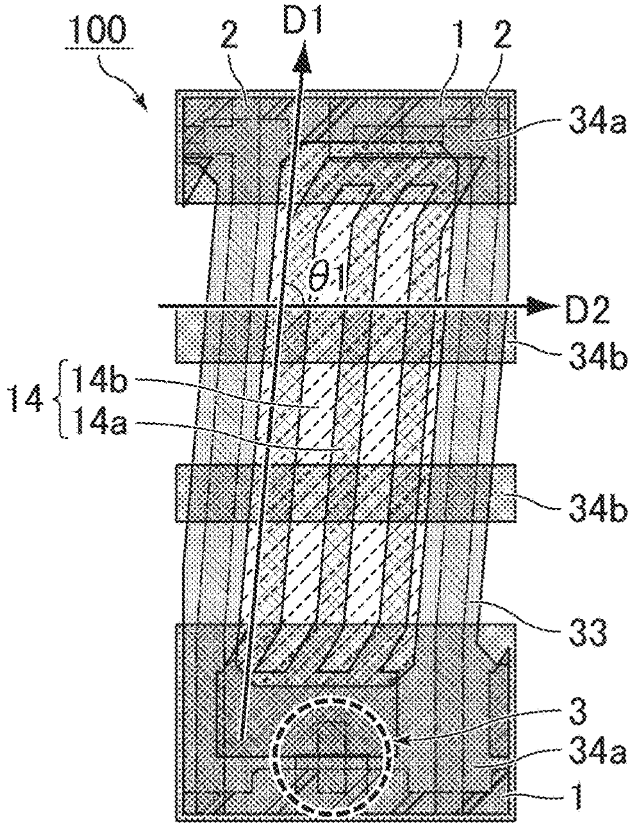
FIG. 3 is a schematic plan view of a picture element in the liquid crystal display device shown in FIG. 2.
Figure 4:
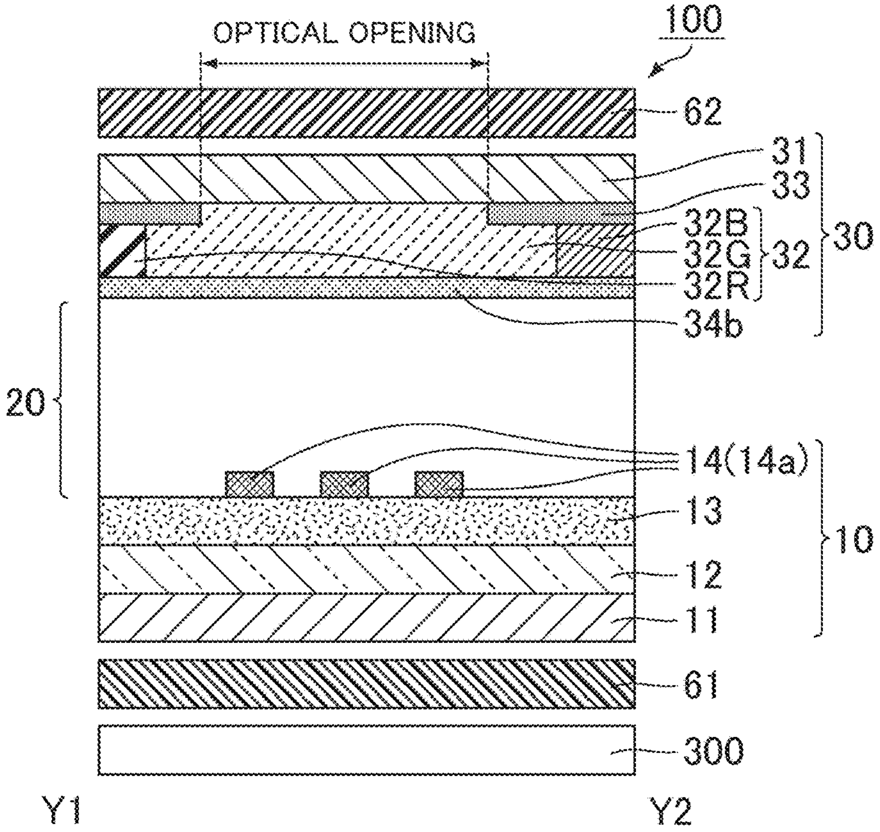
FIG. 4 is a schematic cross-sectional view taken along line Y1-Y2 shown in FIG. 2.
Figure 5:
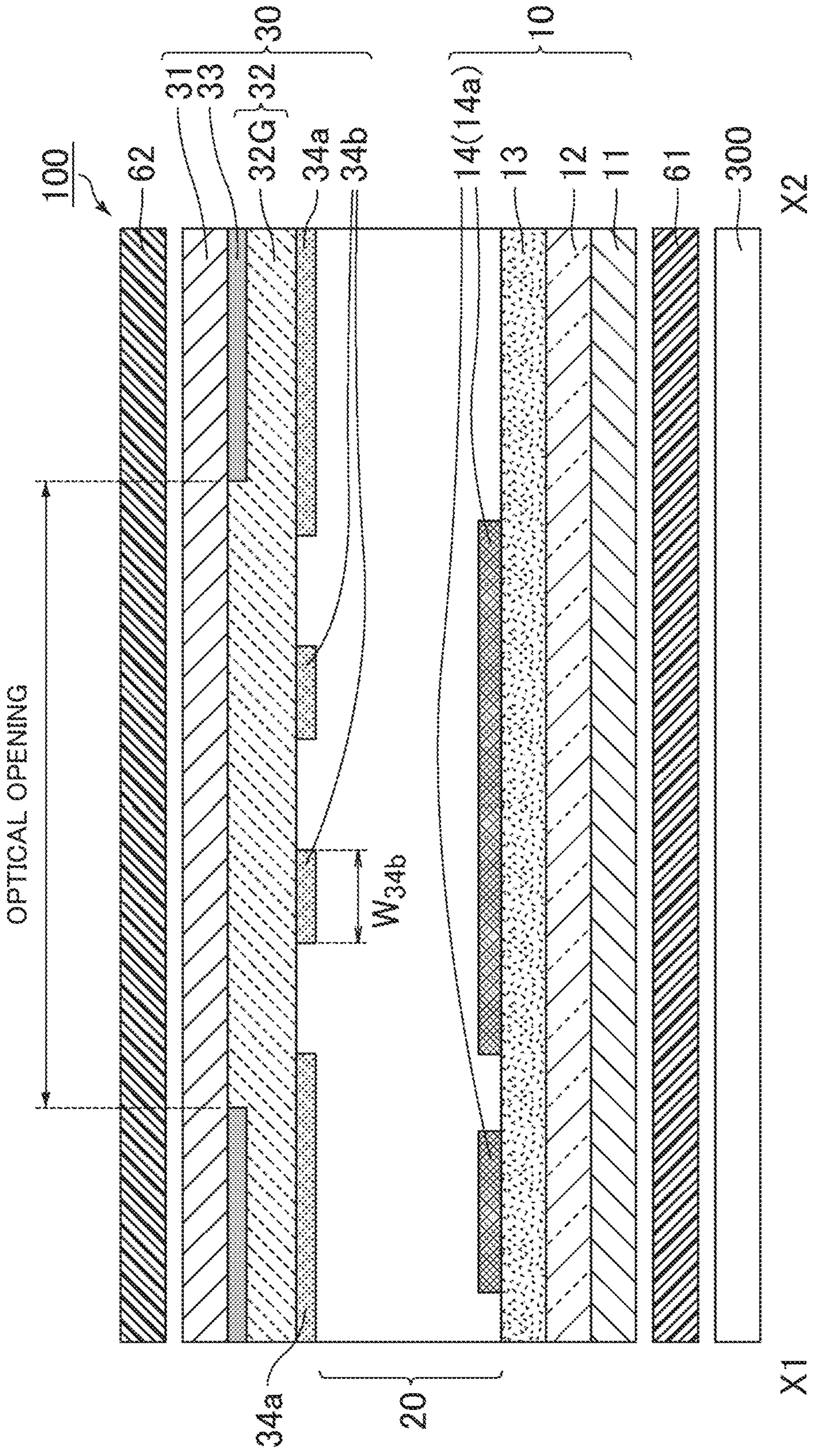
FIG. 5 is a schematic cross-sectional view taken along line X1-X2 shown in FIG. 2.

A description is given below of a structure of the liquid crystal panel with reference to FIGS. 2 to 5. FIG. 2 is a schematic plan view of an exemplary liquid crystal display device in accordance with Embodiment 1. FIG. 3 is a schematic plan view of a picture element in the liquid crystal display device shown in FIG. 2. FIG. 4 is a schematic cross-sectional view taken along line Y1-Y2 shown in FIG. 2. FIG. 5 is a schematic cross-sectional view taken along line X1-X2 shown in FIG. 2.

Referring to FIG. 2, the liquid crystal panel 100 may include a matrix of picture elements. The first substrate 10 may include a plurality of gate lines 1 and a plurality of source lines 2 intersecting with the plurality of gate lines 1. There may be provided thin film transistors 3 (TFTs) as switching elements at the intersections of the gate lines 1 and the source lines 2. In the present specification, a "picture element" refers to a region surrounded by two of the gate lines 1 that are adjacent to each other and two of the source lines 2 that are adjacent to each other as shown in FIGS. 2 and 3. In the present specification, both a first picture element 70 and a second picture element 71 (which will be described later) will be simply referred to as a picture element unless there is a need to distinguish between them.

The plurality of picture elements preferably have optical openings each structured so as to allow light to travel through the liquid crystal panel 100. The optical opening is the region surrounded by a dotted line inside in the picture element shown in FIG. 2. When the liquid crystal panel 100 is transmissive or transflective, the optical openings allow the light emitted on the rear face of the liquid crystal panel 100 to travel toward the front face of the liquid crystal panel 100. When the liquid crystal panel 100 is reflective or transflective, the optical openings allow both the incident light coming from outside the liquid crystal panel 100 and the reflection of the incident light reflected inside the liquid crystal panel 100 and outputted toward outside the liquid crystal panel 100 to travel through the optical openings. Note that, the optical openings may overlap a transmissive member such as a polarizer or a color filter in a plan view. Embodiment 1 describes a case where the liquid crystal panel 100 is transmissive.

Referring to FIGS. 4 and 5, the liquid crystal panel 100 includes the first substrate 10, a liquid crystal layer 20, and the second substrate 30, all of which are provided in this order. FIGS. 4 and 5 show an example where the first substrate 10 has an FFS (fringe field switching) electrode structure that includes a first electrode 12 and a second electrode 14 stacked via a first insulating layer 13. A case is discussed where the first substrate 10 includes a first support substrate 11, the first electrode 12, the first insulating layer 13, and the second electrode 14, all of which are provided in this order. Alternatively, the first substrate 10 may include the first support substrate 11, the second electrode 14, the first insulating layer 13, and the first electrode 12, all of which are provided in this order.

Note that the first substrate may have an IPS (in plane switching) electrode structure (not shown) that includes a first electrode and a second electrode disposed opposite each other. In the IPS scheme, these first and second electrodes may be disposed on the same layer (e.g., the first support substrate 11 or the first insulating layer 13).

The first support substrate 11 and a second support substrate 31 (which will be described later) are not limited in any particular manner and may be made of, for example, a resin such as polycarbonate or glass.

The first insulating layer 13 may be made of, for example, an inorganic material such as a silicon oxide or a silicon nitride.

Either one or both of the first electrode and the second electrode may include a linear electrode section that is provided in each picture element and that extends in a first direction. FIGS. 2 and 3 show an example where the second electrode 14 includes a linear electrode section.

The first electrode 12 may be a plate-like electrode (may be referred to as a solid electrode) with no slits or openings at least in regions overlapping the optical openings of the picture elements in a plan view. The first electrode 12 may be provided in each of a plurality of picture elements, commonly across a plurality of picture elements, or across the entire display area irrespective of the boundaries of the picture elements. The first electrode 12 may be made of, for example, a transparent conductive material such as indium tin oxide (ITO) or indium zinc oxide (IZO).

One second electrode 14 is provided in each picture element. Referring to FIGS. 2 and 3, the second electrode 14 includes a first linear electrode section **14*a* extending in the first direction D1. The first linear electrode section 14*a* needs only to at least partially extend in the first direction D1 and may include a linear electrode section that extends in a direction other than from the first direction D1**.

There may be provided a plurality of first linear electrode sections **14*a*. Adjacent first linear electrode sections 14*a* may have ends thereof coupled together by an electrode material and have openings surrounded by an electrode material. In addition, the second electrode 14 may be such a comb-teeth electrode that adjacent first linear electrode sections 14***a* have open ends or may have a slit between adjacent first linear electrode sections 14*a*. FIGS. 2 and 3 show an example where the ends of the plurality of first linear electrode sections 14*a* are coupled together by an electrode material and there are provided openings 14*b*.

The first linear electrode section 14*a* may have a width of, for example, from 2 to 5 μm. The slit or opening has a width of, for example, from 2 to 5 μm. The width of the first linear electrode section 14*a* and the width of the slit or opening is measured perpendicular to the first direction D1.

The second electrode 14 may be made of, for example, a transparent conductive material such as ITO or IZO. The second electrode 14 may be, for example, electrically connected to an associated one of the source lines 2 via a semiconductor layer in the TFT 3.

Any one of the first electrode 12 and the second electrode 14 is preferably disposed electrically coupled, straddling the plurality of picture elements. "Straddling the plurality of picture elements" indicates such an arrangement as to overlap the plurality of picture elements across the boundaries of the plurality of picture elements. This electric coupling straddling the plurality of picture elements enables a fixed voltage that is common to the plurality of picture elements to be applied to either one of the first electrode 12 and the second electrode 14.

The liquid crystal layer 20 contains liquid crystal molecules. The liquid crystal molecules preferably have a dielectric anisotropy (Δε) with a positive value (positive type) as defined by the following formula (L). In addition, the liquid crystal molecules preferably have a homogeneous alignment under zero applied voltage (in the absence of applied voltage). The direction of the major axis of the liquid crystal molecules in the absence of applied voltage may alternatively be referred to as the direction of the initial alignment of the liquid crystal molecules. This absence of applied voltage comprehensively refers to the liquid crystal layer being placed under an applied voltage that is below the threshold value of the liquid crystal molecules.

$$\Delta\varepsilon = (\text{Permittivity of Liquid Crystal Molecules in Major Axis Direction}) - (\text{Permittivity of Liquid Crystal Molecules in Minor Axis Direction}) \quad (L)$$

The second substrate 30 includes a third electrode 34. The liquid crystal display device in accordance with Embodiment 1 switches between narrow viewing angle mode and wide viewing angle mode by controlling the voltage applied to the third electrode. Specifically, the liquid crystal display device switches between privacy mode and public mode by applying a drive voltage to the third electrode 34, hence generating an electric field in the thickness direction of the liquid crystal layer 20. A display method will be described later.

Referring to FIGS. 4 and 5, the third electrode 34 is disposed on the liquid crystal layer 20 side of the second substrate 30 and opposite the first electrode 12 and/or the second electrode 14 across the liquid crystal layer 20. The first electrode 12 and/or the second electrode 14 are disposed on the liquid crystal layer 20 side of the first substrate 10.

FIGS. 4 and 5 show an example where the second substrate 30 includes the second support substrate 31, a black matrix 33, a color filter 32, and the third electrode 34. Alternatively, the color filter 32 and the black matrix 33 may be provided on the first substrate 10.

Referring to FIGS. 2 and 3, the third electrode 34 may include a linear electrode section (second linear electrode section) 34*a*. The second linear electrode section 34*a* extends in a second direction D2 that intersect with the first direction D1 in a plan view, where the first direction D1 is defined as the extension direction of the first linear electrode section 14*a* of the second electrode that extends in the first direction D1.

The second linear electrode section 34*a* may be disposed between two picture elements that are adjacent to each other in the column direction. The above-described gate lines 1 may extend in the second direction D2, which is the extension direction of the second linear electrode section 34*a*. Referring to FIGS. 2 and 3, the second linear electrode section 34*a* may overlap the gate lines 1 in a plan view. The second linear electrode section 34*a* preferably has a greater width than do the gate lines 1 with a view to offering increased privacy protection. In addition, referring to FIGS. 2 and 3, the second linear electrode section 34*a* may be disposed along the upper and lower ends of one picture element and may partially overlap the optical openings.

The second linear electrode section 34*a* has a width $W_{34a}$ of preferably from 25 μm to 35 μm, both inclusive, more preferably from 27 μm to 33 μm, both inclusive, and even more preferably from 29 μm to 31 μm, both inclusive. The width $W_{34a}$ is an electrode width of the second linear electrode section 34*a* in the direction that is perpendicular to the second direction D2.

The third electrode 34 may further include a third linear electrode section 34*b* that is disposed between the plurality of second linear electrode section 34*a*. The third linear electrode section 34*b* is preferably provided so as to extend in the second direction D2 and also to overlap the optical openings of the picture elements, in a plan view. By the third electrode 34 including the third linear electrode section 34*b*, the high frontal contrast can be maintained, and the contrast can be further restrained when viewed from oblique directions. In locations overlapping the optical openings of the picture elements, there may be provided either a single third linear electrode section 34*b* or a plurality of third linear electrode sections 34*b*.

The third linear electrode section 34*b* preferably has a smaller width $W_{34b}$ than does the second linear electrode section 34*a*. By providing the third linear electrode section 34*b* with a smaller width than the second linear electrode section 34*a*, the frontal contrast can be increased, and the contrast for oblique directions can be further restrained, in privacy mode.

The width $W_{34b}$ is preferably from 2.5 μm to 15 μm, both inclusive, more preferably from 3 μm to 13 μm, both inclusive, and even more preferably from 4 μm to 10 μm, both inclusive. The width $W_{34b}$ is an electrode width of the third linear electrode section 34*b* in the direction perpendicular to the second direction D2.

When there is provided a plurality of third linear electrode sections 34*b*, the third linear electrode sections 34*b* are preferably disposed at equal intervals. Adjacent third linear electrode sections 34*b* are separated by a distance d1 that is preferably from 3 μm to 20 μm, both inclusive, and more preferably from 9 μm to 15 μm, both inclusive.

The second linear electrode section 34*a* and the third linear electrode section 34*b* are preferably electrically connected to each other. The second linear electrode section 34*a* and the third linear electrode section 34*b* may be preferably, for example, coupled together by a connecting portion at an end of the liquid crystal panel, so that the entire third electrode 34 is placed under an equal voltage.

The third electrode 34 (second linear electrode section 34*a* and the third linear electrode section 34*b*) may be termed a horizontal stripe electrode with respect to the first direction D1. By designing the third electrode 34 as a horizontal stripe electrode, privacy protection can increased, for example, over when the third electrode 34 is disposed in the same direction as the first direction D1 (when the third electrode 34 is a vertical stripe electrode) and over when the third electrode 34 has the same shape as a black matrix. Specifically, when the display is in privacy mode, the frontal contrast can be increased, and the contrast for oblique directions (e.g., when viewed from an azimuth of from 0° to 180° and a polar angle of from 35° to 55°) can be reduced. In addition, by designing the third electrode 34 as a transverse stripe, there is provided a portion where the third electrode 34 does not overlap the optical opening, and when the display is in public mode, a vertical electric field does not readily act in the opening of the picture element. Therefore, a high transmittance and a high contrast can be achieved.

The first direction D1 and the second direction D2 make an angle θ1 that is preferably from 80° to 100°, both inclusive, and more preferably from 85° to 95°, both inclusive. The second direction D2 may be parallel to either an absorption axis 62A of a second polarizer 62 or an absorption axis 61A of a first polarizer 61. In Embodiment 1, the second direction D2 is parallel to the absorption axis 62A of the second polarizer 62 (azimuth of from 0° to 180°) as shown in FIG. 1.

The third electrode 34 may be made of a transparent conductive material. The transparent conductive material may be, for example, ITO or IZO.

Referring to FIGS. 2 and 3, one color filter 32 is provided for each picture element so as to overlap the optical opening when the liquid crystal panel 100 is viewed from the front side. The color filter 32 includes, for example, a red color filter 32R, a green color filter 32G, and a blue color filter 32B. As an example, the color filter 32 may be such that the color filters of the same color are provided contiguously in either the row direction or the column direction of the liquid crystal panel 100. The color filter 32 is preferably a dielectric layer.

The black matrix 33 is disposed between a plurality of picture elements. The black matrix 33 may be disposed between the optical openings that are adjacent to each other in either the row direction or the column direction or may be disposed around the optical openings in a plan view. The black matrix 33 may be a black matrix commonly used in the field of liquid crystal display devices and is made preferably of a resin and more preferably of a black resin containing a black pigment or dye.

Alignment films (not shown) may be disposed, one between the first substrate 10 and the liquid crystal layer 20 and another between the second substrate 30 and the liquid crystal layer 20. The alignment films control the initial alignment direction of the liquid crystal molecules in the absence of applied voltage. The alignment films are preferably horizontal alignment films. The horizontal alignment film is preferably specified so that the liquid crystal molecules have an initial (which refers to absence of applied voltage across liquid crystal layer) pretilt angle of from 0° to 1° with respect to the surface of the alignment film.

In addition, the first polarizer 61 and the second polarizer 62 may be disposed respectively opposite the liquid crystal layer 20 in the first substrate 10 and opposite the liquid crystal layer 20 in the second substrate 30. The first polarizer 61 and the second polarizer 62 are preferably disposed in a crossed Nicol position so that the absorption axis 61A of the first polarizer 61 and the absorption axis 62A of the second polarizer 62 are perpendicular to each other. In FIG. 1, the absorption axis 62A of the second polarizer 62 lies at an azimuth of 0° to 180°, and the absorption axis 61A of the first polarizer 61 lies at an azimuth of 90° to 270°. The first polarizer 61 and the second polarizer 62 are preferably linear polarizers.

The liquid crystal panel 100 may include a dielectric layer (not shown) between the third electrode 34 and the liquid crystal layer 20. The provision of the dielectric layer enables restraining the generation of a vertical electric field that is generated between the third electrode 34 and the electrode on the first substrate side in public mode. As a result, in-plane switching drive becomes possible almost without having to cause the liquid crystal molecules to stand upright. Therefore, the transmittance and frontal contrast can be increased for the front direction in a white display when the display is in public mode.

The dielectric layer is a layer other than the alignment films and is a layer made of, for example, a resin that is transparent to light. The dielectric layer preferably has a total light transmittance of greater than or equal to 80%. In the present specification, the total light transmittance is the total light transmittance measured in accordance with JIS K7361-1. The dielectric layer contains, for example, an acrylic-based resin, a polyimide-based resin, or another like resin. The dielectric layer preferably has a thickness of from 0.5 μm to 4 μm, both inclusive.

The liquid crystal display device in accordance with Embodiment 1 may include a backlight 300 on the rear side (first substrate 10 side) of the liquid crystal panel. The backlight 300 is not limited in any particular manner and may be any backlight commonly used in the field of liquid crystal display devices. The backlight 300 may be, for example, an edge-light type where a light source is disposed on an end face of a light-guide plate or a direct type where a large number of light sources are disposed in a plane along with a diffusion plate for increased uniformness.

Display Method

As shown in FIG. 1, the control unit 200 includes a display mode switching unit 201, a gamma correction table memory unit 202, a gamma correction unit 203, and an image data output unit 204. In addition, the liquid crystal display device 1000 may include a gate driver 101, a source driver 102, and a third electrode drive circuit 103.

Referring to FIG. 1, as a display mode switching signal 211 is inputted to the display mode switching unit 201 in the control unit 200 from outside, the display mode switching unit 201 outputs a display mode signal 212 to the third electrode drive circuit 103 and the gamma correction unit 203. First of all, a description is given below of an exemplary display method in both narrow viewing angle mode and wide viewing angle mode with reference to FIGS. 1 and 6. Gamma correction will be described later.

Figure 6:
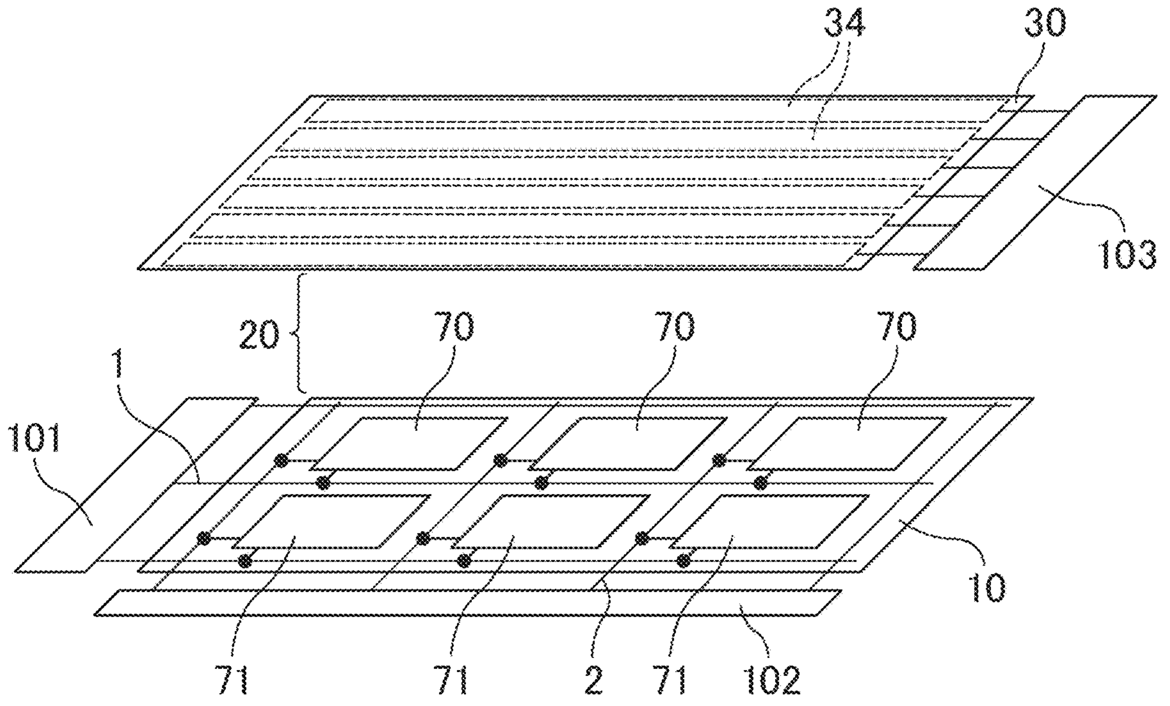
FIG. 6 is a perspective view of only a structure of the periphery of a liquid crystal panel.

FIG. 6 is an illustration of a structure of the periphery of a liquid crystal panel. Referring to FIG. 6, the gate driver 101 is electrically connected to the gate lines 1 provided on the first substrate 10, the source driver 102 is electrically connected to the source lines 2 provided on the first substrate 10, and the third electrode drive circuit 103 is electrically connected to the third electrode 34.

Display Mode Switching Method

The display mode switching unit 201 switches between narrow viewing angle mode and wide viewing angle mode by controlling the voltage applied to the third electrode 34. In wide viewing angle mode (public mode), the third electrode drive circuit 103 applies, as a fixed voltage, a prescribed AC voltage to the third electrode 34 on the basis of the display mode signal 212. In narrow viewing angle mode (privacy mode), the third electrode drive circuit 103 applies a drive voltage that has a different effective value from the fixed voltage to the third electrode 34 on the basis of the display mode signal 212.

In the present specification, the display mode for displaying a first image that can be viewed from a narrow viewing angle range, including the normal to liquid crystal panel, is referred to as narrow viewing angle mode, and the display mode where the first image can be viewed from a wide viewing angle range that covers the narrow viewing angle range is referred to as wide viewing angle mode. In addition, in the present specification, narrow viewing angle mode may alternatively be referred to as privacy mode, and wide viewing angle mode may alternatively be referred to as public mode.

In the narrow viewing angle range, the contrast is preferably less than or equal to 5 when the liquid crystal panel is observed from an oblique direction (at an azimuth of 0° or 180°) at a polar angle. As an example, when the direction vertical to the surface of the liquid crystal panel is taken to be a 0° polar angle, and the direction horizontal to the surface of the liquid crystal panel is taken to be a 90° polar angle, this polar angle is preferably greater than or equal to 60°, more preferably greater than or equal to 45°, and even more preferably greater than or equal to 30°. The wide viewing angle range above refers to the range of polar angles larger than the polar angles in the narrow viewing angle range.

Public Mode

To produce a black display in public mode, a liquid crystal panel drive signal 217 is outputted from the image data output unit 204 to the gate driver 101 and the source driver 102 while applying a prescribed AC voltage as a fixed voltage to the third electrode 34. Note that a black display is a display state where a minimum luminance is reached in each display mode, and a white display is a display state where a maximum luminance is reached in each display mode.

As an original image signal 213 is inputted to an original image data generation unit 205, an original image data 214 is outputted. When no gamma correction is performed, the original image data 214 is outputted to the image data output unit 204, and the image data output unit 204, for example, controls so as to apply a common voltage to the second electrode 14 and the first electrode 12 on the basis of the original image data 214. The common voltage is common to the fixed voltage with the fixed voltage being equal to 0 V. Note that either the common voltage applied to the second electrode 14 and the first electrode 12 may be equal to the fixed voltage or a voltage lower than a threshold value of the liquid crystal molecules with respect to the fixed voltage may be applied. Such a state may be referred to as the absence of applied voltage.

In the absence of applied voltage, since no electric field for driving the liquid crystal molecules is generated in the liquid crystal layer 20 shown in FIG. 6, the liquid crystal molecules are aligned in the initial alignment direction. In the absence of applied voltage where no voltage is applied to the liquid crystal layer, the liquid crystal molecules may be aligned horizontally with respect to the first substrate 10. Since the alignment direction of the liquid crystal molecules does not change in the plane of the liquid crystal layer 20, the liquid crystal panel dose not transmit light from the rear face, hence producing a black display. The initial alignment direction is preferably parallel to the first substrate 10 and in a plan view, also parallel to the absorption axis 61A of the first polarizer 61 or the absorption axis 62A of the second polarizer 62.

To produce a white display in public mode, for example, while a fixed voltage is being applied to the third electrode 34, the liquid crystal panel drive signal 217 is outputted so as to apply a fixed voltage (common voltage) from the image data output unit 204 to any one of the first electrode 12 and the second electrode 14 and as to apply an AC voltage that has a different effective value from the common voltage to the other one of the first electrode 12 and the second electrode 14. A fringe field is generated between the first electrode 12 and the second electrode 14, whereas the electric field in the thickness direction of the liquid crystal layer 20 is small, which differs from privacy mode (detailed later). Therefore, the liquid crystal molecules are aligned parallel to the first substrate 10, and at the same time change their alignment direction, in the electric field generated between the first electrode 12 and the second electrode 14. By the liquid crystal molecules rotating in the plane of the liquid crystal layer 20 and hence changing their initial alignment direction, the major axis direction of the liquid crystal molecules forms an angle with the absorption axis 61A of the first polarizer and the absorption axis 62A of the second polarizer so as to transmit light from the rear face of the liquid crystal panel, hence producing a white display.

Privacy Mode

To produce a black display in privacy mode, the third electrode drive circuit 103 applies, to the third electrode, a drive voltage that differs in effective value from the fixed voltage, and the image data output unit 204 controls so as to apply the fixed voltage (common voltage) to the second electrode 14 and the first electrode 12. An oblique electric field is generated between the third electrode 34 and a combination of the first electrode 12 and the second electrode 14. The liquid crystal molecules incline with respect to the first substrate 10 in the oblique electric field.

Since the liquid crystal molecules do not change their alignment direction in the plane of the liquid crystal layer 20, the liquid crystal panel does not transmit light from the rear face, and meanwhile, the liquid crystal molecules incline with respect to the first substrate, the liquid crystal panel appears more whitish than the black display observed from a narrow viewing angle range when the liquid crystal panel is observed from a wide viewing angle range.

To produce a white display in privacy mode, while the third electrode drive circuit 103 is applying a drive voltage to the third electrode 34, the image data output unit 204 applies the fixed voltage (common voltage) to any one of the first electrode 12 and the second electrode 14 and controls so as to apply an AC voltage that differs in effective value from the common voltage to the other one of the first electrode 12 and the second electrode 14. The drive voltage applied to the third electrode 34 preferably differs in effective value from the AC voltage applied to the first electrode 12 or the second electrode 14 and more preferably has a greater effective value than the AC voltage applied to the first electrode 12 and the second electrode 14. A fringe field is generated between the first electrode 12 and the second electrode 14, and an oblique electric field with respect to the thickness direction of the liquid crystal layer 20 is generated either between the third electrode 34 and the first electrode 12 or between the third electrode 34 and the second electrode 14. As a result, an electric field that is a sum of the fringe field and the oblique electric field is generated in the liquid crystal layer 20. Therefore, under the electric field generated between the combination of the first electrode 12 and the second electrode 14 and the third electrode 34, the liquid crystal molecules incline with respect to the first substrate 10 and at the same time change their alignment direction, thereby producing a white display. Since the liquid crystal molecules incline with respect to the first substrate, the first image is observable from a narrow viewing angle range. On the other hand, when the liquid crystal panel is observed from a wide viewing angle range, the image decreases extremely in contrast or undergoes other changes, which renders it difficult to observe the first image.

The liquid crystal display device can switch between the white display in privacy mode and the white display in public mode described above by applying a voltage to the third electrode. Similarly, the liquid crystal display device can switch between the black display in privacy mode and the black display in public mode by applying a voltage to the third electrode. This description equally applies to grayscale displays.

In the liquid crystal display device in accordance with the embodiment, when the liquid crystal panel is observed from an oblique direction, high-level privacy protection is achieved by switching from wide viewing angle mode (public mode) to narrow viewing angle mode (privacy mode) as described above. Note that the oblique direction above refers to cases when the liquid crystal panel is observed from an azimuth of 0° and 180° and a polar angle of 35° to 55° when the right-hand direction of the liquid crystal panel on which a desired image is being displayed is taken to be 0°, and the angle increases counterclockwise.

Gamma Correction

According to the study by the inventors of the disclosure, when the liquid crystal display device switches between narrow viewing angle mode and wide viewing angle mode by controlling the voltage applied to the third electrode on the opposite substrate side as described above, for example, the luminance and coloration can differ between narrow viewing angle mode and wide viewing angle mode when the liquid crystal panel is observed from the front (normal direction).

Figure 7:
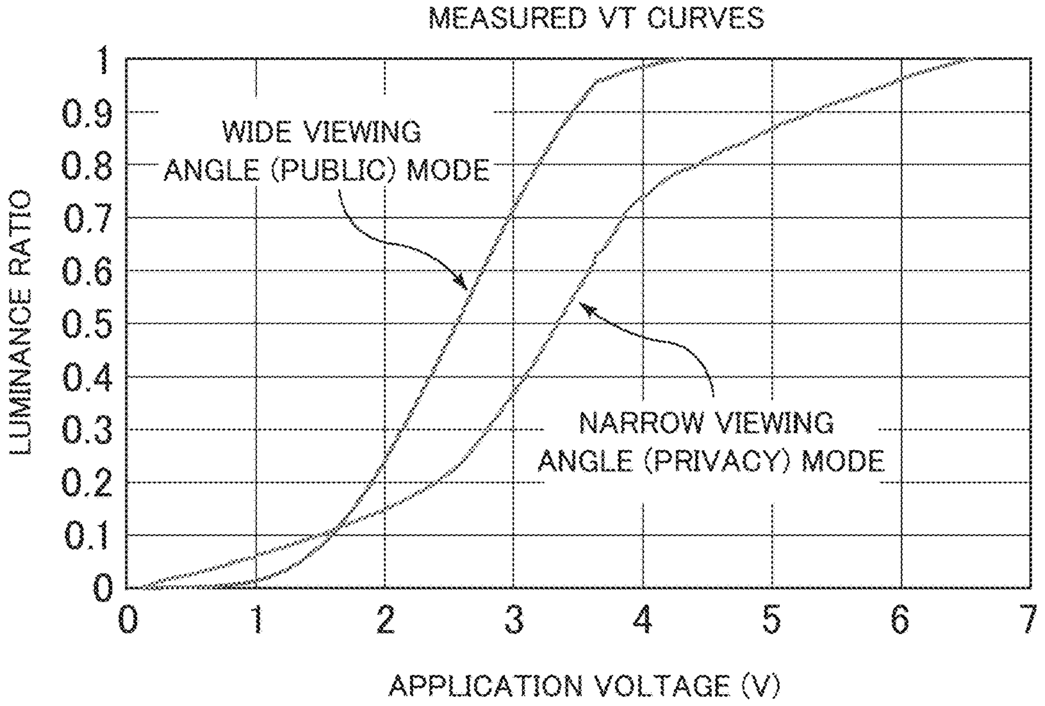
FIG. 7 is a graph showing VT curves drawn based on actual measured values when a display is produced in narrow viewing angle mode and in wide viewing angle mode.

FIG. 7 is a graph showing VT curves drawn based on actual measured values when a display is produced in narrow viewing angle mode and in wide viewing angle mode. FIG. 7 shows that when the liquid crystal panel is switched to narrow viewing angle mode by applying the fixed voltage to the third electrode without gamma correction, the VT curve in narrow viewing angle mode shifts toward the high voltage end in comparison with the VT curve in wide viewing angle mode. For example, when the application voltage is approximately equal to 4.5 V, the luminance ratio is 1 in wide viewing angle mode, but falls approximately to 0.8 in narrow viewing angle mode. Due to such differences in VT curve characteristics, if the liquid crystal panel is driven by the same voltage in narrow viewing angle mode and in wide viewing angle mode, the luminance decreases largely, thereby producing different coloration in gray levels. In addition, a decrease in luminance in narrow viewing angle mode leads to, for example, a decrease in contrast and an increase in power consumption. In Embodiment 1, these differences in, for example, luminance and coloration can be reduced by performing gamma correction using different gamma correction tables in narrow viewing angle mode and in wide viewing angle mode.

Referring to FIG. 1, when the display mode switching signal 211 is inputted to the display mode switching unit 201 in the control unit 200 from outside, the display mode switching unit 201 outputs the display mode signal 212 to the gamma correction unit 203. In addition, the original image data generation unit 205 outputs the original image data 214 to the gamma correction unit 203 on the basis of the inputted original image signal 213.

The gamma correction unit 203 acquires different gamma correction tables 215 from the gamma correction table memory unit 202 for narrow viewing angle mode and for wide viewing angle mode in accordance with the inputted display mode signal 212.

The gamma correction table memory unit 202 contains gamma correction tables that associate gray levels to application voltages to the first electrode and/or the second electrode. The gamma correction tables can be prepared by, for example, the following method. First, VT curves are generated on the basis of actual measured values by producing displays in narrow viewing angle mode and in wide viewing angle mode without gamma correction. The VT curve is a graph representing a relationship between the application voltage (V) and the luminance ratio (T). In the present specification, the "application voltage" for the VT curve refers to, when a common voltage to an electrode that is either one of the first electrode and the second electrode is taken to be 0 V, the voltage applied to the other electrode with this 0 V being taken as the reference. In the present specification, the luminance ratio is such that luminance is 0 at gray level 0 and 1 at gray level 255 when the luminance of a picture element is expressed by 256 gray levels (gray levels 0 to 255).

A gamma correction table is prepared by calculating the relationship between gray levels and predetermined voltages on the basis of the VT curve measured above in advance in such a manner that the grayscale characteristics defined by grayscale and luminance ratios have particular gamma values. Note that the graph representing a relationship between grayscale and luminance ratios may alternatively be referred to as the γ curve. In Embodiment 1, gamma correction tables are individually prepared respectively for wide viewing angle mode and for narrow viewing angle mode. A predetermined voltage is a voltage specified to be outputted from the image data output unit 204 and refers to, when a common voltage to an electrode that is either one of the first electrode and the second electrode is taken to be 0 V, the voltage applied to the other electrode with this 0 V being taken as the reference.

The relationship between the luminance ratio L, gray level G, and gamma value γ is given by following equation (1).

Math. 1

$$L = \left(\frac{G}{255}\right)^{\gamma} \tag{1}$$

The gamma correction table memory unit 202 may contain a gamma correction table that shows a constant gamma value between gray levels 0 and 255. The gamma value is preferably from 1.8 to 2.6 both inclusive, more preferably from 2.0 to 2.4 both inclusive, and even more preferably equal to 2.2.

In the following, the gamma correction table used in narrow viewing angle mode may alternatively be referred to as the "gamma correction table for use in narrow viewing angle mode," and the gamma correction table used in wide viewing angle mode may alternatively be referred to as the "gamma correction table for use in wide viewing angle mode." The gamma correction table for use in narrow viewing angle mode and the gamma correction table for use in wide viewing angle mode may contain the same gamma value. The gamma values for wide viewing angle mode and the gamma values in the gamma correction table are preferably from 1.8 to 2.6 both inclusive, more preferably from 2.0 to 2.4 both inclusive, and even more preferably equal to 2.2.

In addition, the gamma correction table for use in narrow viewing angle mode and the gamma correction table for use in wide viewing angle mode may contain different gamma values. The gamma value in the gamma correction table used in narrow viewing angle mode is preferably lower than the gamma value in the gamma correction table used in wide viewing angle mode. This configuration can further increase privacy protection in narrow viewing angle mode.

The gamma values in the gamma correction table for use in wide viewing angle mode are preferably from 1.8 to 2.6 both inclusive, more preferably from 2.0 to 2.4 both inclusive, and even more preferably equal to 2.2. The gamma values in the gamma correction table for use in narrow viewing angle mode need only to be lower than the gamma values in the gamma correction table for use in wide viewing angle mode, but the gamma values in the other gamma correction table are preferably 1.8 or more with a view to efficiently restraining changes in coloration from the front.

For instance, when the gamma value in the gamma correction table for use in wide viewing angle mode is 2.2, the gamma value in the gamma correction table for use in narrow viewing angle mode may be 2.2. With a view to improving privacy protection from oblique directions, the gamma values in the gamma correction table for use in narrow viewing angle mode may be 2.0 or may be 1.8.

The gamma value in the gamma correction table used in narrow viewing angle mode preferably differs from the gamma value in the gamma correction table used in wide viewing angle mode by no more than 0.4. By rendering these gamma value differences no more than 0.4, it is possible to both improve privacy protection from oblique directions and lower coloration from the front. This is because although privacy protection from oblique directions improves with an increasing foregoing difference from the gamma value, if the foregoing difference from the gamma value is too large, differences in coloration grow between display modes when the liquid crystal panel is observed from the front. The foregoing difference from the gamma value is more preferably no more than 0.2.

Figure 8:
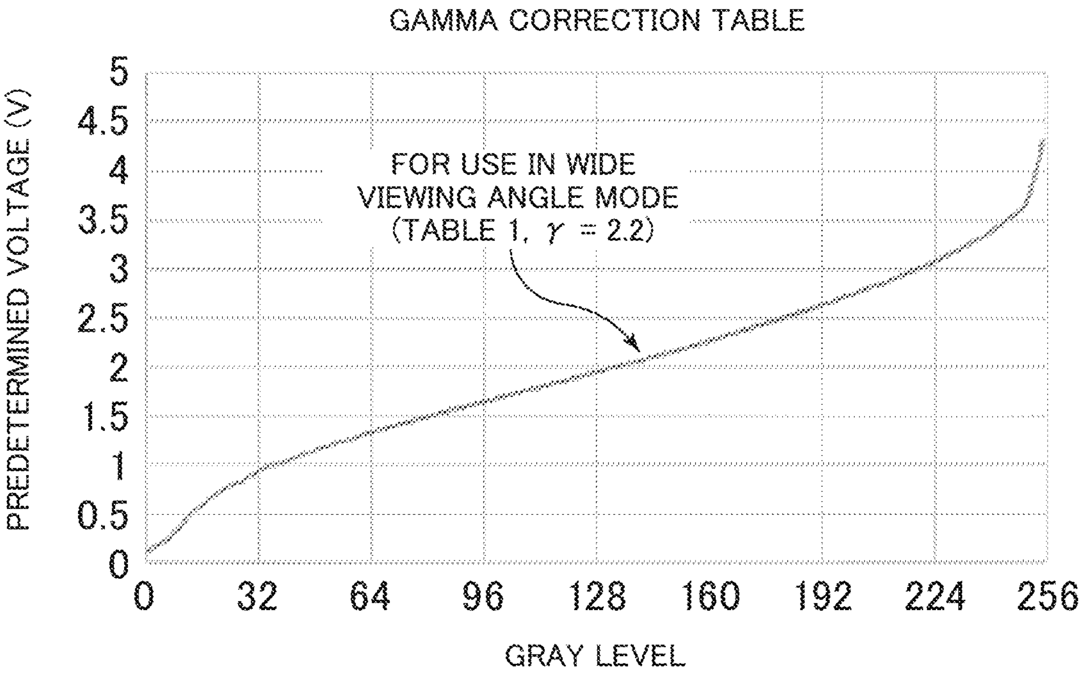
FIG. 8 is a graph representing a gamma correction table (Table 1) specified to achieve $\gamma=2.2$ on the basis of the VT curve for wide viewing angle mode shown in FIG. 7.

FIG. 8 is a graph representing a gamma correction table (Table 1) specified on the basis of the VT curve in wide viewing angle mode shown in FIG. 7 so that $\gamma=2.2$. The gamma correction table shown in FIG. 8 is prepared by calculating the relationship between the gray levels and the predetermined voltages in advance on the basis of the VT curve in wide viewing angle mode shown in FIG. 7 so that the grayscale characteristics of the $\gamma$ curve in wide viewing angle mode is such that $\gamma=2.2$.

Figure 9:
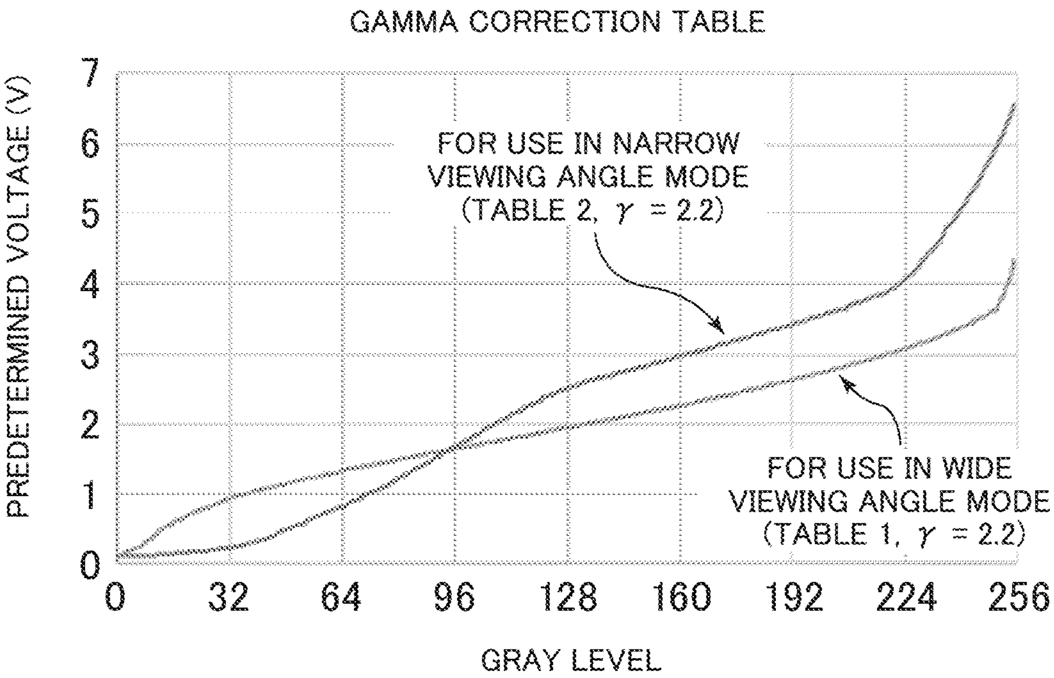
FIG. 9 is a graph representing a gamma correction table for narrow viewing angle mode and wide viewing angle mode.

FIG. 9 is a graph representing a gamma correction table for use in narrow viewing angle mode and a gamma correction table for use in wide viewing angle mode. The gamma correction table for use in narrow viewing angle mode shown in FIG. 9 is prepared by calculating the relationship between the gray levels and the predetermined voltages in advance on the basis of the VT curve in narrow viewing angle mode shown in FIG. 7 so that the grayscale characteristics of the $\gamma$ curve in narrow viewing angle mode is such that $\gamma=2.2$. The gamma correction table for use in narrow viewing angle mode may alternatively be referred to as "Table 2."

The gamma correction unit 203 performs gamma correction respectively on original image data on the basis of different gamma correction tables in narrow viewing angle mode and in wide viewing angle mode and outputs obtained gamma-corrected image data 216 to the image data output unit 204. The gamma correction unit 203 outputs the gamma-corrected image data 216 to the image data output unit 204 in reference to the correspondence information between the gray levels and predetermined voltages in the gamma correction tables with respect to the grayscale information in the original image data 214, to obtain a desirable luminance ratio. For example, the gamma correction is performed using a gamma correction table (Table 1) for use in wide viewing angle mode shown in FIG. 9 in wide viewing angle mode and using a gamma correction table (Table 2) for use in narrow viewing angle mode shown in FIG. 9 in narrow viewing angle mode.

The image data output unit 204 outputs the liquid crystal panel drive signal 217 to the liquid crystal panel 100 to adjust the application voltage to the first electrode and/or the second electrode described above.

By taking the VT curve characteristics of the liquid crystal panel into consideration, gamma correction is performed using different gamma correction tables respectively in narrow viewing angle mode and in wide viewing angle mode. For example, gamma correction may be performed so as to achieve such grayscale characteristics as $\gamma=2.2$, both in narrow viewing angle mode and in wide viewing angle mode. Hence, the shape of the $\gamma$ curve becomes the same in narrow viewing angle mode and in wide viewing angle mode, and differences in, for example, luminance and coloration can be reduced even when the liquid crystal panel is switched between narrow viewing angle mode and wide viewing angle mode.

The luminance ratio of the $\gamma$ curve is the value with the luminance at gray level 0 being equal to 0 and the luminance at gray level 255 being equal to 1 when the luminance from the front of the liquid crystal panel outputted in accordance with the gamma correction table is expressed by 256 gray levels (gray levels 0 to 255).

Embodiment 2

In Embodiment 2, the gamma correction table memory unit contains a gamma correction table in which the gamma value has a plurality of values between gray levels 0 to 255.

In Embodiment 2, either one or both of the gamma correction table for use in wide viewing angle mode and the gamma correction table for use in narrow viewing angle mode need(s) only to contain a gamma value that has a plurality of values between gray levels 0 to 255. Either one of the gamma correction table for use in wide viewing angle mode and the gamma correction table for use in narrow viewing angle mode may contain a gamma value that is constant between gray levels 0 to 255, and the other gamma correction table may contain a gamma value that has a plurality of values between gray levels 0 to 255. This configuration can render the amount of change in the luminance ratio at intermediate gray levels in narrow viewing angle mode smaller than the amount of change in the luminance ratio at intermediate gray levels in wide viewing angle mode, thereby further restraining luminance changes from the front.

More preferably, the gamma correction table used in wide viewing angle mode contains a gamma value that is constant between gray levels 0 to 255, and the gamma correction table used in narrow viewing angle mode contains a gamma value that has a plurality of values between gray levels 0 to 255.

Letting X be any gray level from 0 to 255, the gamma value in the gamma correction table used in narrow viewing angle mode may be smaller than the gamma value in the gamma correction table used in wide viewing angle mode at gray levels from 0 inclusive to X exclusive and larger than the gamma value in the gamma correction table used in wide viewing angle mode at gray levels from X to 255 both inclusive.

For instance, when the gamma value in the gamma correction table for use in wide viewing angle mode is equal to 2.2 (constant) at gray levels 0 to 255, the gamma value in the gamma correction table for use in narrow viewing angle mode may be 2.2 or lower at gray levels from 0 inclusive to X exclusive and may exceed 2.2 at gray levels from X to 255 both inclusive. The gamma correction table for use in narrow viewing angle mode preferably contains a gamma value of 2.0 or lower for gray levels from 0 inclusive to X exclusive and more preferably of 1.8 or higher with a view to achieving both visibility in narrow viewing angle mode and restraining of changes in coloration from the front. The gamma correction table for use in narrow viewing angle mode preferably contains a gamma value of 2.4 or higher for gray levels from X to 255 both inclusive and more preferably of 2.6 or lower with a view to achieving both visibility in narrow viewing angle mode and restraining of changes in coloration from the front. Arbitrary gray level X described above may be any of 64, 128, and 192. There is a trade-off between the viewing angle control capability and the effect of restraining changes in coloration from the front between narrow viewing angle mode and wide viewing angle mode.

Letting X represent any one of gray levels 0 to 255, and Y be the gray level higher than X, the gamma value in the gamma correction table used in narrow viewing angle mode may be smaller than the gamma value in the gamma correction table used in wide viewing angle mode at gray levels from 0 inclusive to X exclusive, and the gamma value in the gamma correction table used in narrow viewing angle mode may be larger than the gamma value in the gamma correction table used in wide viewing angle mode at gray levels from Y to 255 both inclusive.

For instance, when the gamma value in the gamma correction table for use in wide viewing angle mode is equal to 2.2 (constant) at gray levels 0 to 255, the gamma value in the gamma correction table for use in narrow viewing angle mode may be 2.2 or lower at gray levels from 0 inclusive to X exclusive and higher than 2.2 at gray levels from Y to 255 both inclusive. The gamma correction table for use in narrow viewing angle mode preferably contains a gamma value of 2.0 or lower at gray levels from 0 inclusive to X exclusive and more preferably of 1.8 or higher with a view to achieving both visibility in narrow viewing angle mode and restraining of changes in coloration from the front. The gamma correction table for use in narrow viewing angle mode preferably contains a gamma value of 2.4 or higher at gray levels from Y to 255 both inclusive and more preferably of 2.6 or lower with a view to achieving both visibility in narrow viewing angle mode and restraining of changes in coloration from the front.

Arbitrary gray levels X, Y described above may be any of 64, 128, and 192. Specific examples of X, Y combinations may include Y=192 at X=64, Y=128 at X=64, and Y=192 at X=128. Between gray levels X to Y, a gamma value may be specified suitably for each gray level so that the luminance ratio smoothly rises from gray level X toward gray level Y.

Embodiment 3

Figure 10:
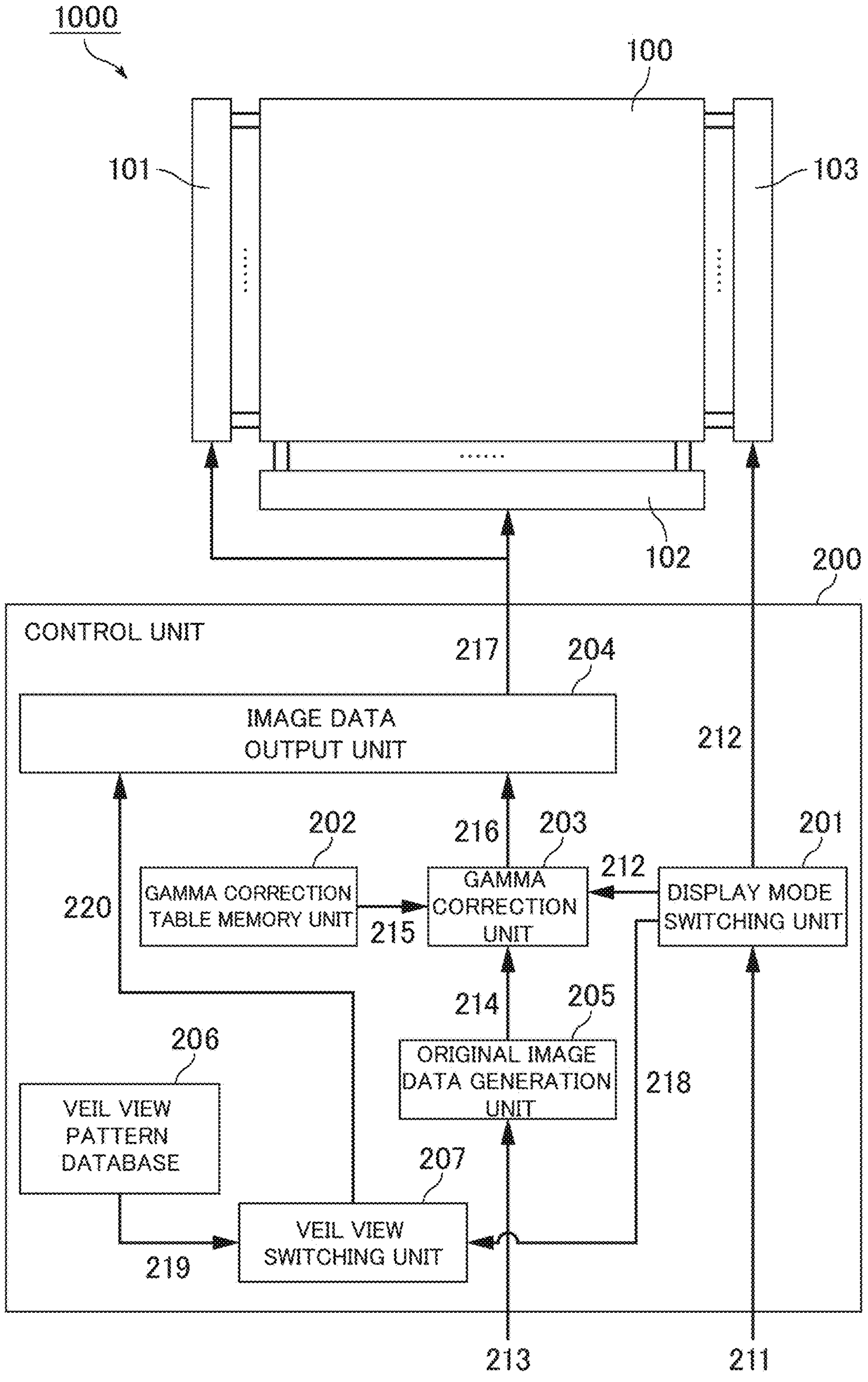
FIG. 10 is a block diagram representing an exemplary display method of displaying a veil view pattern.

In Embodiment 3, privacy protection can be further improved by combining a veil view function of displaying a second image overlapping a first image as well as switching the display mode for the ordinary display of the first image. A description is given below of an exemplary method of displaying an image by the veil view function with reference to FIG. 10. FIG. 10 is a block diagram representing an exemplary display method of displaying a veil view pattern. The control unit 200 inputs different image signals to the first picture element and the second picture element so that the second image, which is different from the first image, can be viewed from the wide viewing angle range. This display method may alternatively be referred to as the "veil view function."

Referring to FIG. 10, the control unit 200 may further include: a veil view pattern database 206 (hereinafter, a "database 206") containing information (veil view pattern data) related to a veil view pattern; and a veil view switching unit 207.

As the veil view switching unit 207 is fed with a veil view display switching signal 218, the veil view switching unit 207 acquires veil view pattern data 219 from the database 206 and outputs a veil view pattern image signal 220 to the above-described image data output unit 204. The image data output unit 204 combines the gamma-corrected image data 216 outputted from the above-described gamma correction unit 203 and the veil view pattern image signal 220 to output the liquid crystal panel drive signal 217 to the gate driver 101 and the source driver 102.

Since the display by the veil view function can further increase privacy protection by being combined with narrow viewing angle mode, the veil view display switching signal 218 may be inputted from the aforementioned the display mode switching unit 201 to the veil view switching unit 207 when narrow viewing angle mode is selected.

For instance, when the common voltage is applied to the second electrode 14, with respect to the first electrode 12, different voltages are applied respectively to the first electrodes 12 corresponding to the first picture element 70 and the second picture element 71 so that the second image can be viewed from a wide viewing angle range. In such cases, one first electrode 12 is preferably provided in each picture element. On the other hand, when the common voltage is applied to the first electrode 12, with respect to the second electrode 14, different voltages are applied respectively to the second electrodes 14 corresponding to the first picture element 70 and the second picture element 71 so that the second image can be viewed from a wide viewing angle range.

Figure 11:
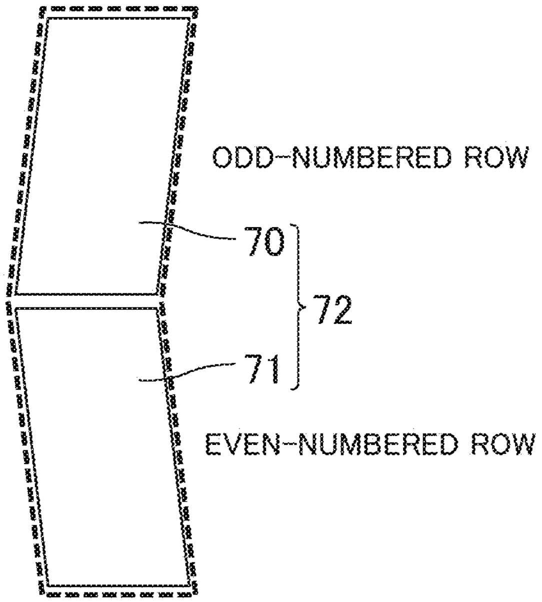
FIG. 11 is a schematic plan view of an example of a single display unit in a liquid crystal panel.
Figure 12:
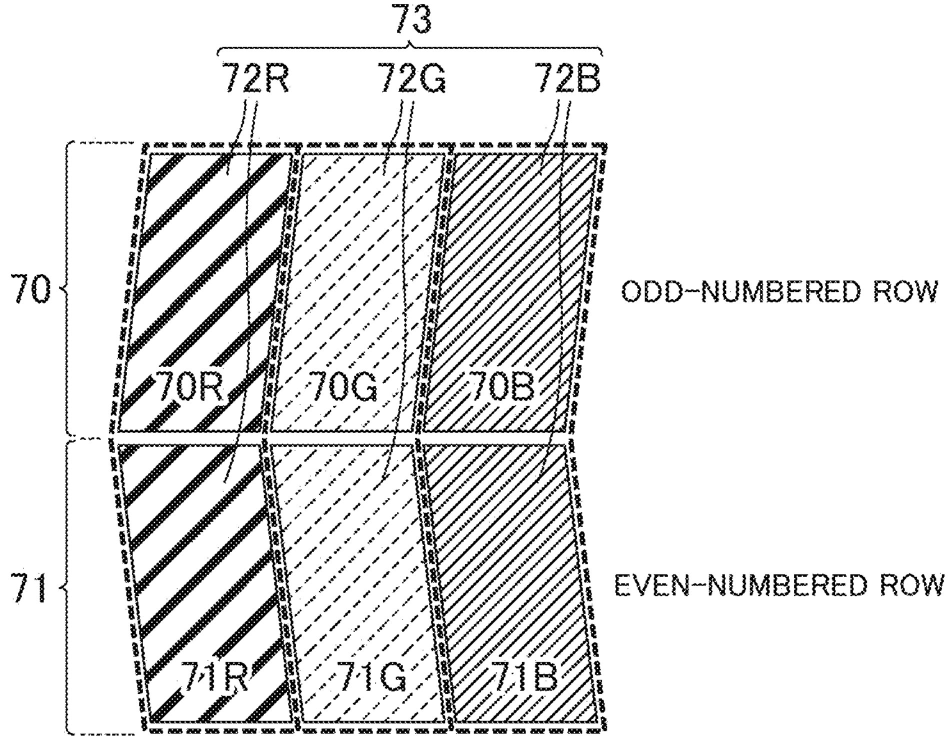
FIG. 12 is a schematic plan view of an exemplary color element in producing a color display by a veil view function.

FIG. 11 is a schematic plan view of an example of a single display unit in a liquid crystal panel. FIG. 12 is a schematic plan view of an exemplary color element in producing a color display by the veil view function. Referring to FIG. 11, the liquid crystal panel 100 may include a plurality of display units 72 for producing an image display by the veil view function. The display units 72 are preferably arranged adjacent to each other in the column direction and include a pair of picture elements one of which is the first picture element 70 selected from an odd-numbered row and the other one of which is the second picture element 71 selected from an even-numbered row.

The first picture element 70 and the second picture element 71 may be regarded as a single picture element respectively as shown in FIGS. 2 and 11. Alternatively, as shown in FIG. 12, the combination of a first red picture element 70R, a first green picture element 70G, and a first blue picture element 70B may be regarded as the first picture element 70, or the combination of a second red picture element 71R, a second green picture element 71G, and a second blue picture element 71B may be regarded as the second picture element 71. Note that when a color display is produced by an ordinary display method, individual picture elements including red, green, and blue are independently driven to produce a color display. To produce an ordinary color display, a display can be produced with twice the resolution of a color display achieved by the veil view function.

To produce a color display, the liquid crystal panel preferably includes a red display unit 72R including the first red picture element 70R and the second red picture element 71R, a green display unit 72G including the first green picture element 70G and the second green picture element 71G, and a blue display unit 72B including the first blue picture element 70B and the second blue picture element 71B. A color element 73 may include a red display unit 72R, a green display unit 72G, and a blue display unit 72B. The first and second picture elements of each color overlap the color filter 32R of each color in optical openings respectively.

Letting, for example, Data1 be luminance data values of an original image that one wants to display as the first image, a method for displaying an image by the veil view function involves dividing Data1 equally into two data values Data2 and Data3, inputting data values Data1+Data2 to any one of the first picture element 70 and the second picture element 71, and inputting data values Data1−Data3 to the other one of the first picture element 70 and the second picture element 71. When the liquid crystal panel is observed from a narrow viewing angle range, the luminance of the first picture element 70 and the luminance of the second picture element 71 are spatially averaged out and perceived as the luminance of the original image; on the other hand, when the liquid crystal panel is observed from a wide viewing angle range, the luminance is perceived as Data1+Data2 or Data1−Data3.

Figure 13:
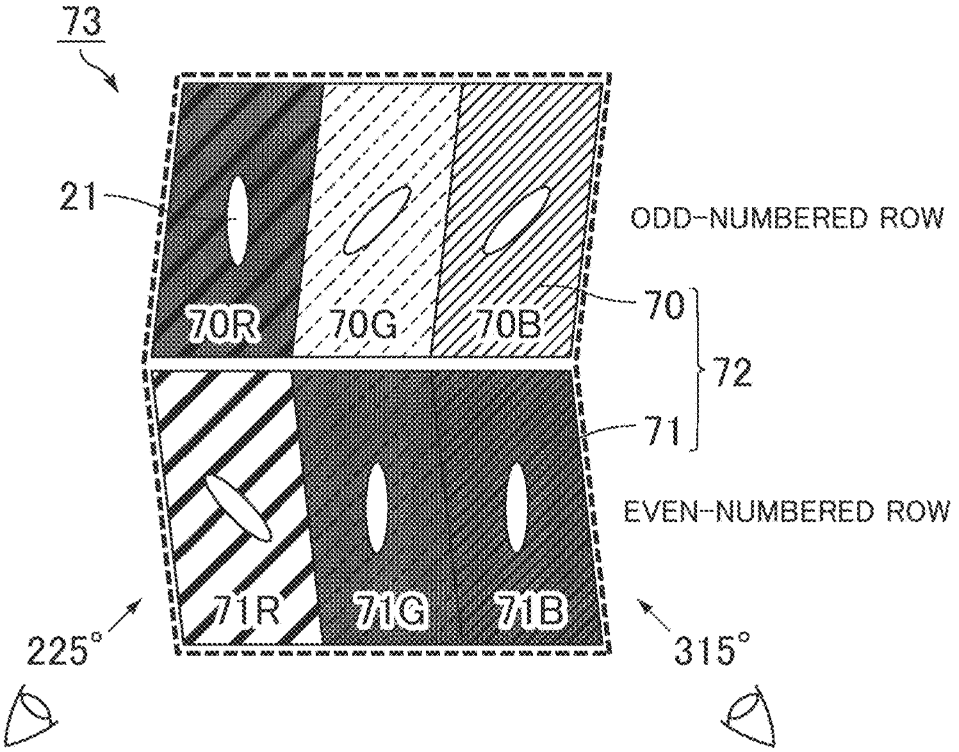
FIG. 13 is a schematic plan view of an exemplary display pattern of color elements.

FIG. 13 is a schematic plan view of an exemplary display pattern of color elements. Referring to FIG. 13, when the first red picture element 70R, the second green picture element 71G, and the second blue picture element 71B produce a black display, the second red picture element 71R, the first green picture element 70G, and the first blue picture element 70B produce a white display, and the liquid crystal panel is viewed from an azimuth of 225°, the liquid crystal molecules in the second red picture element 71R are observed from the minor axis direction of the liquid crystal molecules in which the retardation is high, and therefore the viewer observes the red color, whereas the liquid crystal molecules in the first green picture element 70G and the first blue picture element 70B are viewed from the major axis direction of the liquid crystal molecules in which the retardation is low, and therefore no corresponding color is observed. As a result, the red color is observed. On the other hand, when the liquid crystal panel is observed from an azimuth of 315°, the liquid crystal molecules in the first green picture element 70G and the first blue picture element 70B are observed from the minor axis direction of the liquid crystal molecules, and therefore the cyan color, which is a mixture of blue and green, is observed, whereas the liquid crystal molecules in the second red picture element 71R are observed from the major axis direction, and no corresponding color is observed. As a result, the cyan color is observed.

Figure 14:
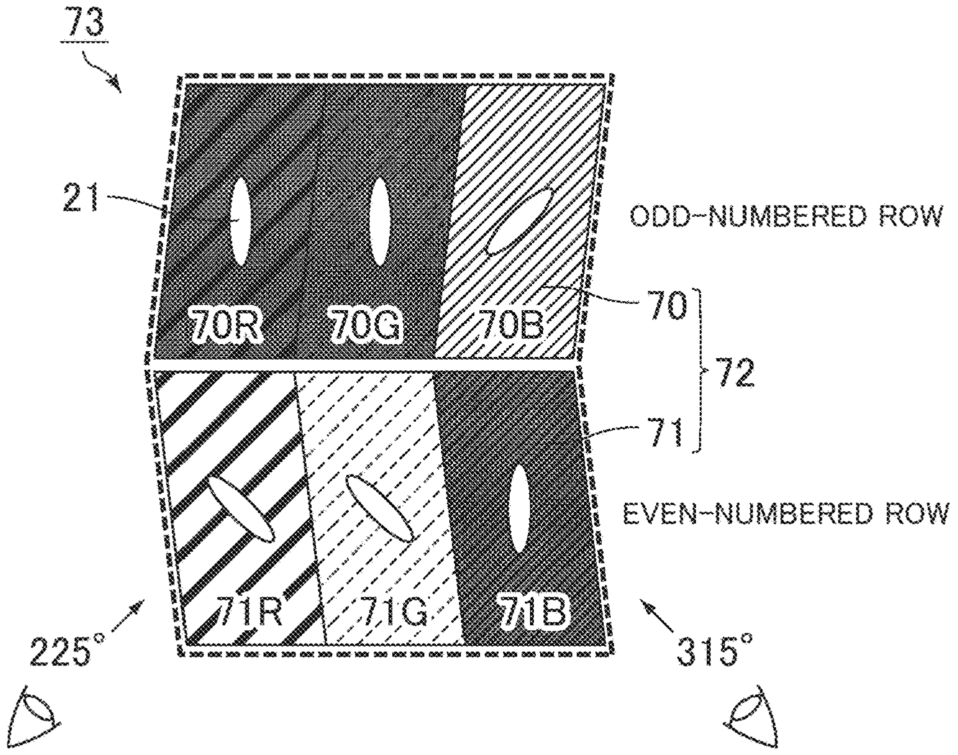
FIG. 14 is a schematic plan view of another exemplary display pattern of color elements.

FIG. 14 is a schematic plan view of another exemplary display pattern of color elements. Referring to FIG. 14, when the first red picture element 70R, the first green picture element 70G, and the second blue picture element 71B produce a black display, the second red picture element 71R, the second green picture element 71G, and the first blue picture element 70B produce a white display, and the liquid crystal panel is viewed from an azimuth of 225°, the yellow color, which is a mixture of red and green, is observed, and the blue color is observed from an azimuth of 315°.

By combining the display pattern of color elements shown in FIG. 13 and the display pattern of color elements shown in FIG. 14, a white display is observed when the liquid crystal panel is observed from the normal to the liquid crystal panel (from the front). In the range of intermediate gray levels, there is a large difference in contrast between the videos observed with the plurality of picture elements disposed in an odd-numbered row side and with the plurality of picture elements disposed in an even-numbered row side. It is preferable to form a soft veil view pattern in the range of intermediate gray levels that produces such sufficiently different visibility in odd-numbered row side/even-numbered row side.

The second image is preferably a veil view pattern. The veil view pattern is a display image displayed over the first image to render it difficult to visually recognize the first image. The display of the veil view pattern can further improves privacy protection. The veil view pattern is not limited in any particular manner and may be, for example, a geometric pattern such as stripes or a checkered pattern, characters, or an image.

EXAMPLES

The following will describe effects of the disclosure by way of examples and comparative examples: the disclosure is however not limited by these examples.

Example 1

Example 1 was a specific example of Embodiment 1 and included the structure shown in FIGS. 1 to 6. The first substrate 10 had an FFS-type electrode structure, and the first electrode 12 was a solid electrode with no openings. One second electrode 14 was provided in each picture element and had an electrode structure including three 2.5 μm wide, first linear electrode sections 14*a* and the 3.5 μm wide openings 14*b* between the first linear electrode sections 14*a*. The liquid crystal molecules were a positive liquid crystal material.

The third electrode 34 was disposed on the second substrate 30. The third electrode 34 included the second linear electrode section 34*a* disposed along the upper and lower ends of the picture element and the two, third linear electrode sections 34*b* overlapping the optical openings. The second linear electrode section 34*a* had a width $W_{34a}$ of 31 μm, and the third linear electrode section 34*b* had a width $W_{34b}$ of 5 μm. The distance d1 by which adjacent third linear electrode sections 34*b* were separated from each other was 11 μm.

The angle θ1 made by the extension direction (first direction D1) of the first linear electrode section 14*a* and the extension direction (second direction D2) of the second linear electrode section 34*a* and the third linear electrode section 34*b* of the third electrode was 80°.

The fixed voltage (common voltage) was applied to the third electrode In wide viewing angle mode. As the fixed voltage, a constant voltage of 0 V was applied. An AC voltage of 4 V was applied to the third electrode with respect to the fixed voltage in narrow viewing angle mode. A grayscale display was produced by applying the common voltage (0 V) to the first electrode 12 and changing the voltage applied to the second electrode 14 both in wide viewing angle mode and in narrow viewing angle mode.

FIGS. 7 to 9 described earlier are also graphs for Example 1. In Example 1, a gamma correction table for use in wide viewing angle mode specified so as to achieve such grayscale characteristics as γ=2.2 shown in FIG. 9 and a gamma correction table for use in narrow viewing angle mode specified so as to achieve such grayscale characteristics as γ=2.2 shown in FIG. 9 were prepared on the basis of the VT curve in narrow viewing angle mode and in wide viewing angle mode shown in FIG. 7. Note that the gamma correction table for use in wide viewing angle mode in FIG. 9 is the same as the gamma correction table for use in wide viewing angle mode in FIG. 8. In Example 1, gamma correction was performed using Table 1 in wide viewing angle mode and using Table 2 in narrow viewing angle mode.

In Example 1, since the grayscale characteristics were corrected so that γ=2.2 in post-gamma correction wide viewing angle mode and in post-gamma correction narrow viewing angle mode, the resultant γ curve in wide viewing angle mode matched with the resultant γ curve in narrow viewing angle mode. Therefore, the luminance and coloration of the liquid crystal panel did not change when switched between wide viewing angle mode and narrow viewing angle mode.

Comparative Example 1

In Comparative In Example 1, gamma correction was performed using the same liquid crystal panel as in Example 1 and using the same gamma correction table in narrow viewing angle mode and in wide viewing angle mode. In the comparative example, gamma correction was performed using gamma correction Table 1 shown in FIG. 8 both in narrow viewing angle mode and in wide viewing angle mode.

Figure 15:
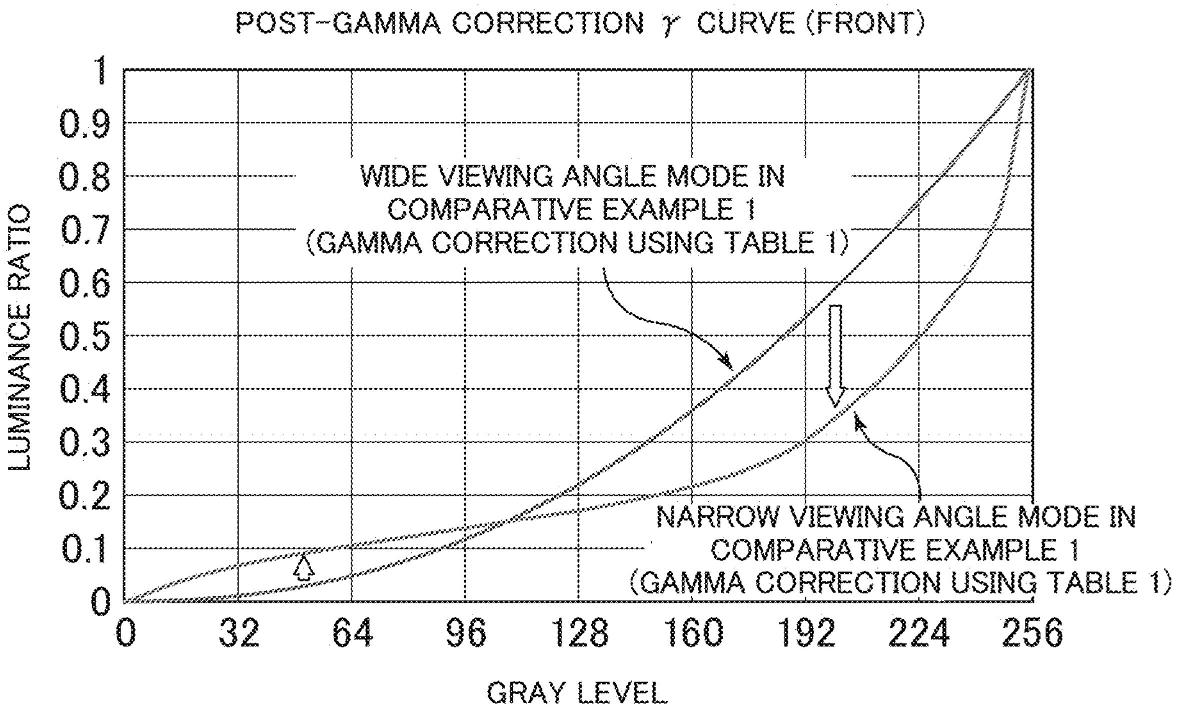
FIG. 15 is a graph showing γ curves for a liquid crystal display device of Comparative Example 1 both in narrow viewing angle mode and in wide viewing angle mode.

FIG. 15 is a graph showing γ curves for a liquid crystal display device of Comparative Example 1 both in narrow viewing angle mode and in wide viewing angle mode. Referring to FIG. 15, as a result of gamma correction using the same gamma correction table in narrow viewing angle mode and in wide viewing angle mode, the shape of the γ curve in wide viewing angle mode differed greatly from the shape of the γ curve in narrow viewing angle mode. FIG. 15 shows that the luminance was higher at low gray levels and lower at high gray levels in narrow viewing angle mode than in wide viewing angle mode and that the color expression lost its vividness in displays in narrow viewing angle mode.

Example 2

Figure 16:
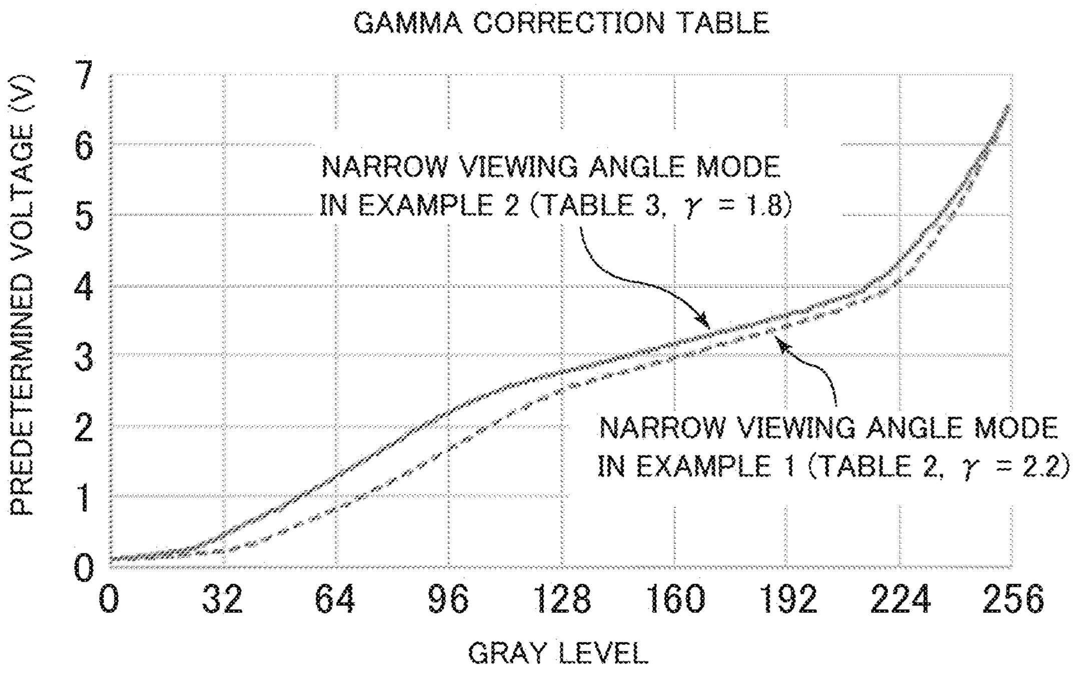
FIG. 16 is a graph representing a gamma correction table for use in narrow viewing angle mode used in Example 1 and a gamma correction table for use in narrow viewing angle mode used in Example 2.

In Example 2, gamma correction was performed using the same liquid crystal panel as in Example 1 and using Table 1 in wide viewing angle mode similarly to Example 1. In narrow viewing angle mode, gamma correction was performed by preparing a gamma correction table for use in narrow viewing angle mode (Table 3) specified on the basis of the VT curve for narrow viewing angle mode shown in FIG. 7 so as to achieve such grayscale characteristics as γ=1.8. FIG. 16 is a graph representing a gamma correction table for use in narrow viewing angle mode used in Example 1 and a gamma correction table for use in narrow viewing angle mode used in Example 2.

Figure 17:
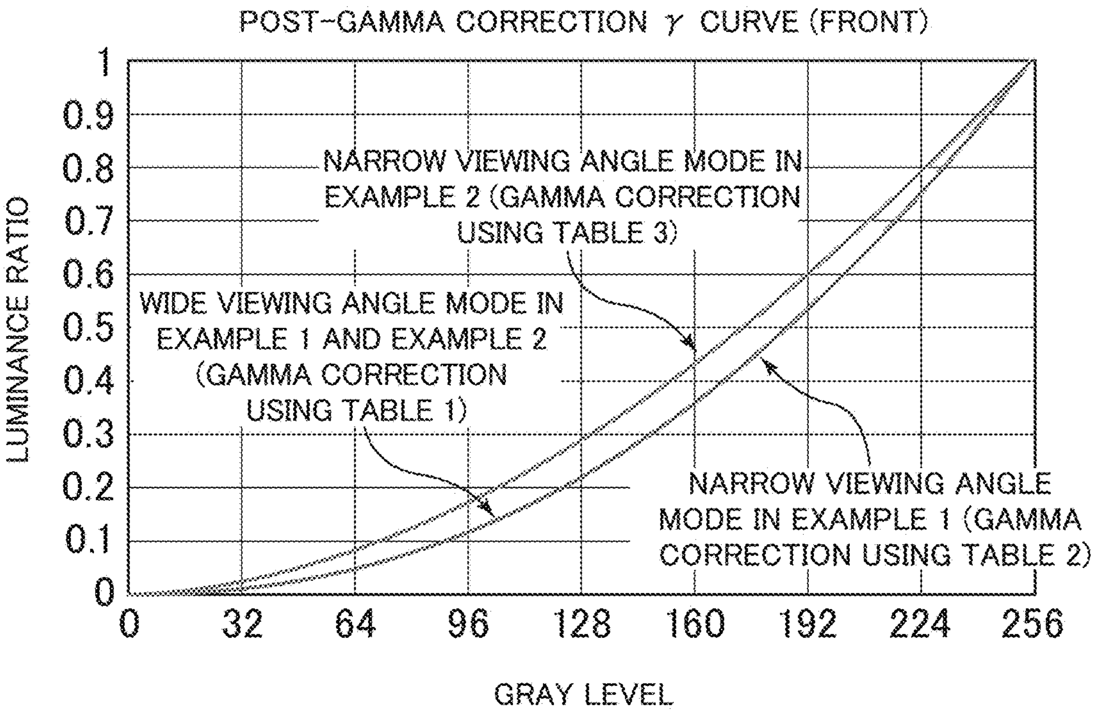
FIG. 17 is a graph showing γ curves in Example 1 and Example 2 for comparison when the liquid crystal panel was observed from the front in narrow viewing angle mode and in wide viewing angle mode.
Figure 18:
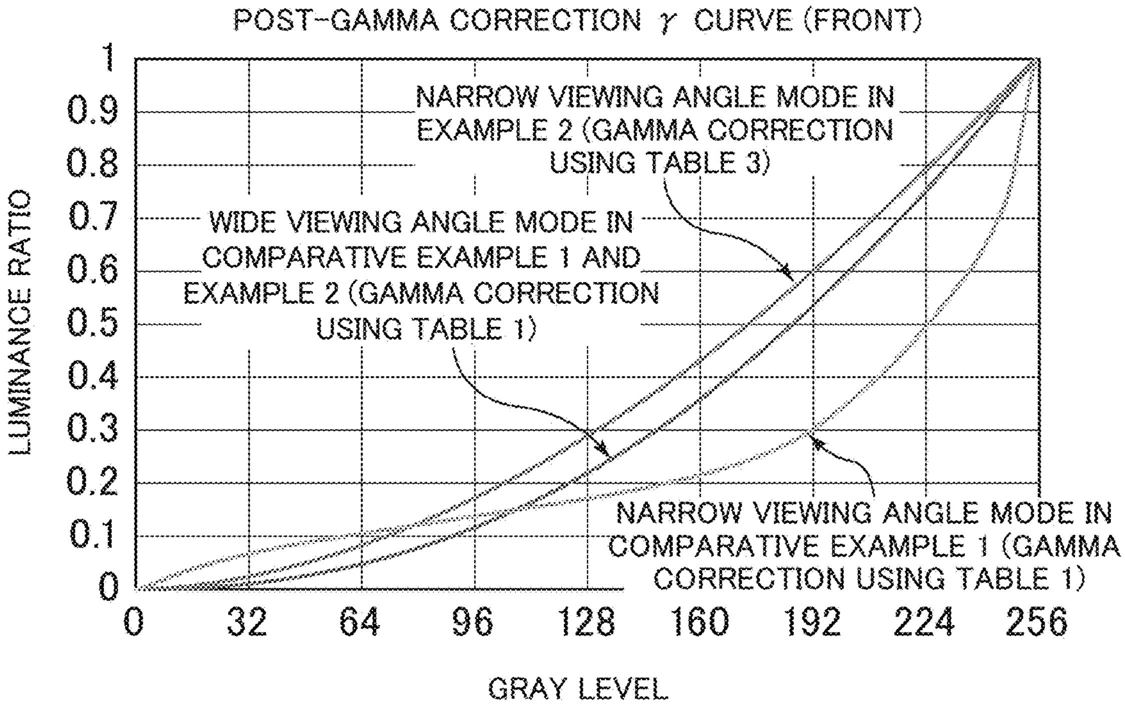
FIG. 18 is a graph showing γ curves in Example 2 and Comparative Example 1 for comparison when the liquid crystal panel was observed from the front in narrow viewing angle mode and in wide viewing angle mode.

FIG. 17 is a graph showing γ curves in Example 1 and Example 2 for comparison when the liquid crystal panel was observed from the front in narrow viewing angle mode and in wide viewing angle mode. FIG. 18 is a graph showing γ curves in Example 2 and Comparative Example 1 for comparison when the liquid crystal panel was observed from the front in narrow viewing angle mode and in wide viewing angle mode. In Example 2, the luminance ratio was slightly higher at intermediate gray levels in narrow viewing angle mode than in Example 1 as shown in FIG. 17, whereas the luminance ratio difference was smaller, and the sense of incongruity in coloration was reduced, between narrow viewing angle mode and wide viewing angle mode than in Comparative Example 1 as shown in FIG. 18.

Figure 19:
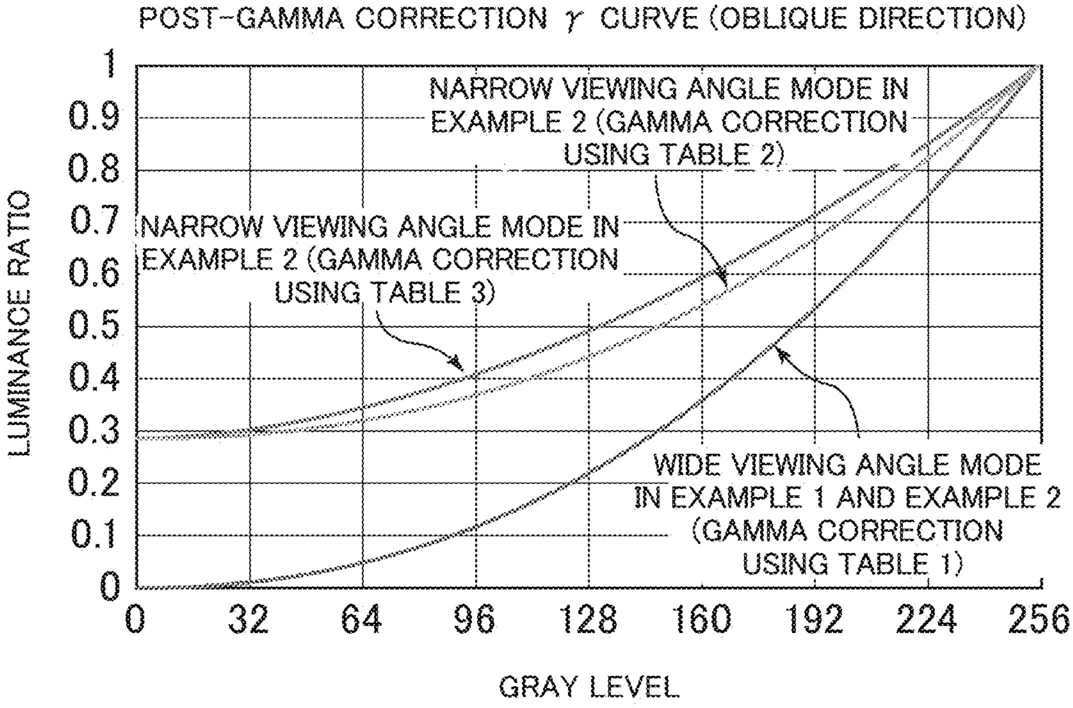
FIG. 19 is a graph showing γ curves in Example 1 and Example 2 for comparison when the liquid crystal panel was observed from an oblique direction in narrow viewing angle mode and in wide viewing angle mode.

FIG. 19 is a graph showing γ curves in Example 1 and Example 2 for comparison when the liquid crystal panel was observed from an oblique direction in narrow viewing angle mode and in wide viewing angle mode. FIG. 19 demonstrates that in both Examples 1 and 2, the luminance ratio is higher at gray level 0 in narrow viewing angle mode than in wide viewing angle mode when the liquid crystal panel was observed from an oblique direction (from an azimuth of 180° and a polar angle of) 45°, which verifies that the visibility was restricted for improved privacy protection. In addition, in Example 2, the luminance ratio was higher at intermediate gray levels in narrow viewing angle mode than in Example 1, and when the liquid crystal panel was observed from an oblique direction, the visibility was lower, resulting in a whitish appearance, which indicates that privacy protection was further improved.

Example 3

In Example 3, gamma correction was performed using the same liquid crystal panel as in Example 1 and using Table 1 in wide viewing angle mode similarly to Example 1. In narrow viewing angle mode, gamma correction was performed by preparing a gamma correction table for use in narrow viewing angle mode (Table 4) specified on the basis of the VT curve for narrow viewing angle mode shown in FIG. 7 so as to achieve such grayscale characteristics as γ=2.0.

In Example 3, again, the luminance ratio difference was smaller, and the sense of incongruity in coloration was reduced, between narrow viewing angle mode and wide viewing angle mode than in Comparative Example 1. In addition, in Example 3, the luminance ratio was higher at intermediate gray levels in narrow viewing angle mode than in Example 1, and when the liquid crystal panel was observed from an oblique direction, the visibility was lower, which indicates that privacy protection was improved over Example 1, albeit not as much as in Example 2.

Example 4

Example 4 was a specific example of Embodiment 2 and used a gamma correction table containing a gamma value having a plurality of values between gray levels 0 to 255. In Example 4, gamma correction was performed using the same liquid crystal panel as in Example 1 and using Table 1 in wide viewing angle mode similarly to Example 1. Table 1 contained a constant γ value of 2.2 between gray levels 0 to 255. In narrow viewing angle mode in Example 4, gamma correction was performed by preparing a gamma correction table (Table 5) containing a γ value that varied from 2.0 to 2.4 between gray levels 0 to 255 as shown in Table 1 below.

Figure 20:
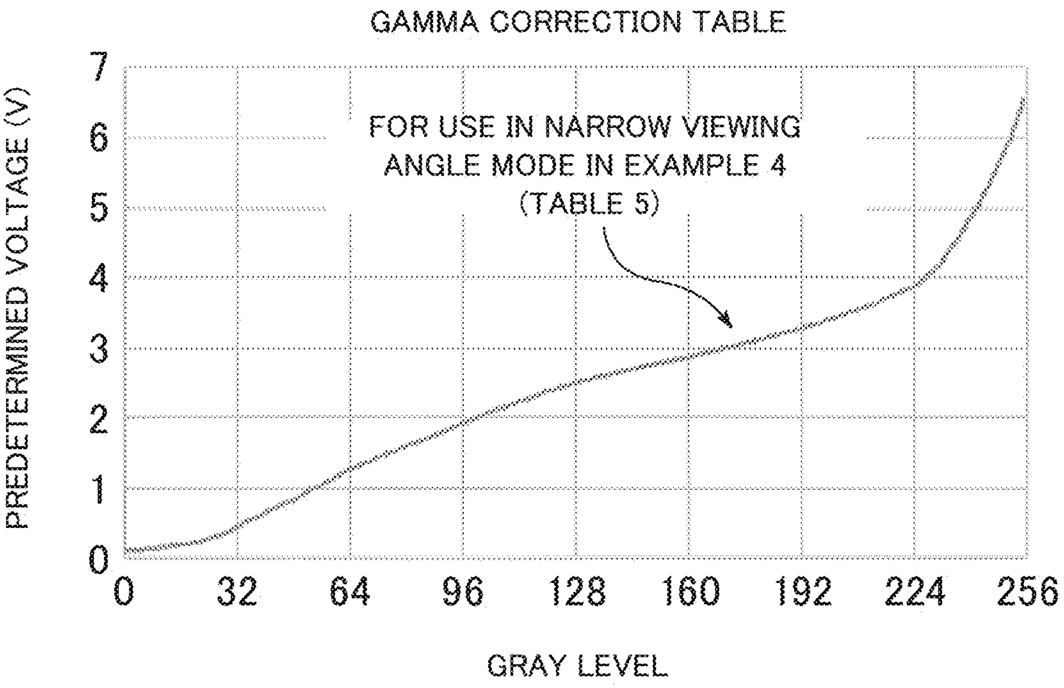
FIG. 20 is a graph representing a gamma correction table for use in narrow viewing angle mode used in Example 4.

FIG. 20 is a graph representing a gamma correction table for use in narrow viewing angle mode used in Example 4.

As described above, in the liquid crystal panel 100, the visibility was reduced, and privacy protection was improved, by increasing the luminance for an oblique black display (gray level 0) in narrow viewing angle mode to extremely reduce the contrast for oblique direction. In Example 4, γ was not fixed and varied for each gray level, in narrow viewing angle mode so that γ=1.8 at gray levels less than or equal to 64 and that γ=2.6 at gray levels greater than or equal to 192. In Example 4, the contrast was reduced only at intermediate gray levels than in Example 1 by varying the γ value from 1.8 to 2.6 in the gray level range of 64 to 192. Since images in an ordinary display are often expressed by intermediate gray levels, the visibility was further reduced, and privacy protection was improved, by lowering the contrast at intermediate gray levels when the liquid crystal panel was observed from an oblique direction in narrow viewing angle mode.

Figure 21:
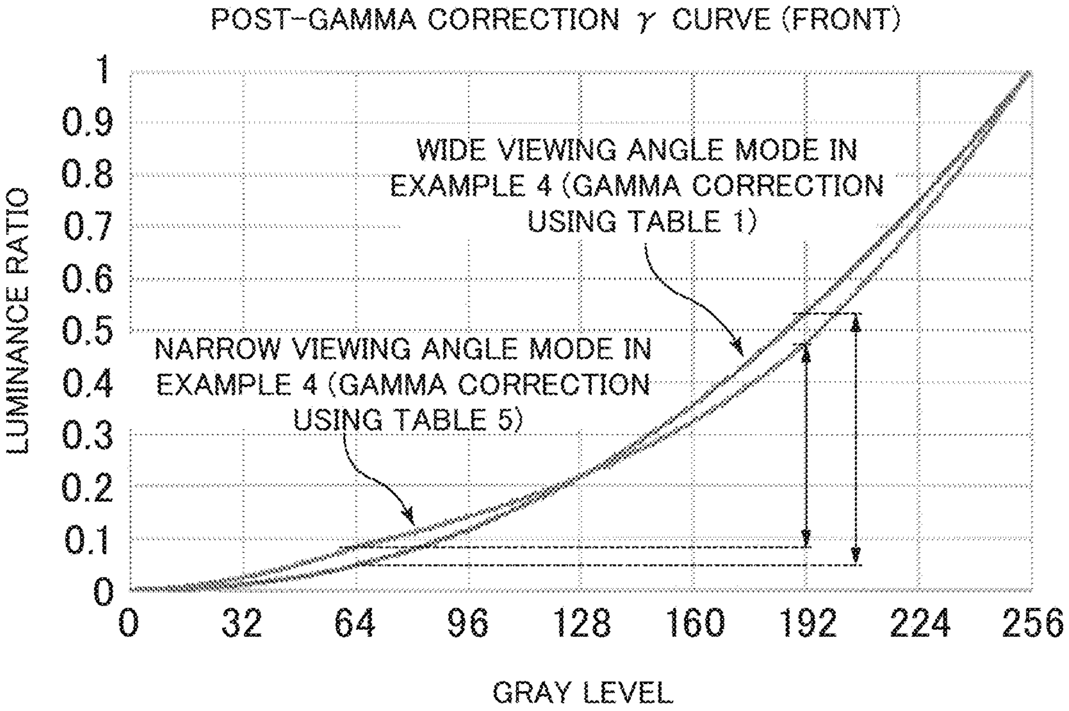
FIG. 21 is a graph showing γ curves in Example 4 when the liquid crystal panel was observed from the front in narrow viewing angle mode and in wide viewing angle mode.

FIG. 21 is a graph showing γ curves in Example 4 when the liquid crystal panel was observed from the front in narrow viewing angle mode and in wide viewing angle mode. FIG. 21 shows that the amount of change in the luminance ratio at gray levels 64 to 192 was smaller in narrow viewing angle mode than in wide viewing angle mode. Since the γ value was restrained to variations in the rage of 1.8 to 2.6, the front visibility in narrow viewing angle mode was at such good levels that changes in the luminance were not visually recognizable.

Examples 5 to 7

Examples 5 to 7 were the same as Example 4, except that gamma correction was performed by preparing gamma correction tables (Table 6 to 8) containing a γ value that varied between gray levels 0 to 255 in narrow viewing angle mode as shown in Table 1 below.

Figure 22:
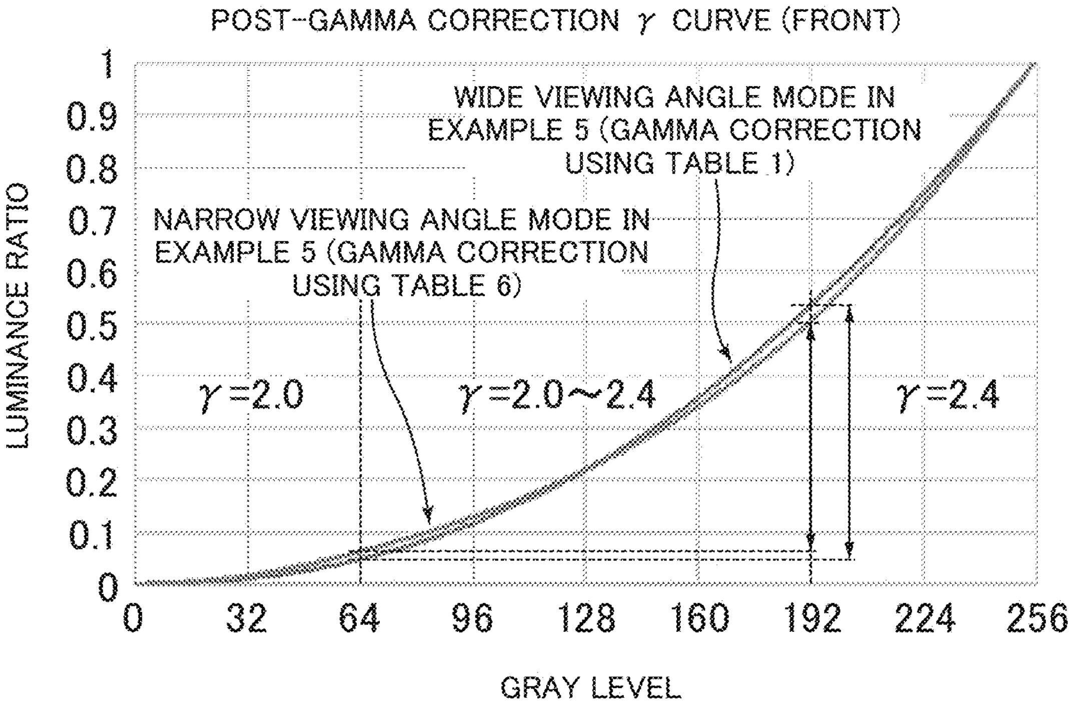
FIG. 22 is a graph showing γ curves in Example 5 when the liquid crystal panel was observed from the front in narrow viewing angle mode and in wide viewing angle mode.

In Example 5, the contrast was further reduced only at intermediate gray levels than in Example 1, by varying γ from 2.0 to 2.4 in the gray level range of 64 to 192. As a result, when the liquid crystal panel was observed from an oblique direction in narrow viewing angle mode, the visibility was further reduced, and privacy protection was improved. FIG. 22 is a graph showing γ curves in Example 5 when the liquid crystal panel was observed from the front in narrow viewing angle mode and in wide viewing angle mode. Referring to FIG. 22, in Example 5, again, the amount of change in the luminance ratio was smaller in narrow viewing angle mode than in wide viewing angle mode at gray levels 64 to 192, and the front visibility in narrow viewing angle mode was at such good levels that changes in the luminance were not visually recognizable.

In Examples 6 and 7, the amount of change in the luminance ratio was smaller in narrow viewing angle mode than in wide viewing angle mode respectively at gray levels 64 to 128 and at gray levels 128 to 192, and the front visibility was good in narrow viewing angle mode. In addition, in Examples 6 and 7, the contrast was reduced respectively at gray levels 64 to 128 and at gray levels 128 to 192 over Example 1.

(1) The visibility from an oblique direction, (2) the front luminance, and (3) the front coloration, all in narrow viewing angle mode for Examples 1 to 7 and Comparative Example 1, were evaluated by the following criteria. Results are collectively shown in Table 2 below.

(1) Visibility from Oblique Direction

A display image was displayed in narrow viewing angle mode on the liquid crystal display devices of the examples and the comparative example and observed from an oblique direction (from an azimuth of 0-180° and a polar angle of) 45°, to evaluate whether or not the display image was visually recognizable. Difficulty in visual recognition of the display image in narrow viewing angle mode in Compara-

TABLE 1

| Gamma Correction Table for Narrow Viewing Angle (Privacy) Mode | | | | |
|---|---|---|---|---|
| Example 4 | Table 5 | Gray Levels 0 to 64 | | γ = 1.8 |
| | | Gray Levels 64 to 192 | γ = 1.8~2.6 | γ was incremented by 0.00625 for each gray level so that γ = 1.8 at gray level 64, γ = 2.2 at gray level 128, and γ = 2.6 at gray level 192. |
| | | Gray Level 192 to 255 | | γ = 2.6 |
| Example 5 | Table 6 | Gray Levels 0 to 64 | | γ = 2.0 |
| | | Gray Levels 64 to 192 | γ = 2.0~2.4 | γ was incremented by 0.00315 for each gray level so that γ = 2.0 at gray level 64, γ = 2.2 at gray level 128, and γ = 2.4 at gray level 192. |
| | | Gray Level 192 to 255 | | γ = 2.4 |
| Example 6 | Table 7 | Gray Levels 0 to 64 | | γ = 1.8 |
| | | Gray Levels 64 to 128 | γ = 1.8~2.2 | γ was incremented by 0.00625 for each gray level so that γ = 1.8 at gray level 64 and γ = 2.2 at gray level 128. |
| | | Gray Levels 128 to 255 | | γ = 2.2 |
| Example 7 | Table 8 | Gray Levels 0 to 128 | | γ = 2.2 |
| | | Gray Levels 128 to 192 | γ = 2.2~2.6 | γ was incremented by 0.00625 for each gray level γ = 2.2 at gray level 128 and γ = 2.6 at gray level 192. |
| | | Gray Levels 192 to 255 | | γ = 2.6 |

tive Example 1 was given 1 point, and the visibility in narrow viewing angle mode in each example was given from point 1 to point 3. A higher point indicates that the display image is difficult to visually recognize in narrow viewing angle mode and gives better privacy protection. The display image was a color landscape image.

(2) Front Luminance

The luminance was measured in the normal direction at gray level 255 in narrow viewing angle mode on the liquid crystal display devices of the examples and the comparative example, with the luminance in the normal direction at gray level 255 in wide viewing angle mode being equal to 100%. The front luminance in narrow viewing angle mode was given a ○ mark if the front luminance was greater than or equal to 90% and a x mark if the front luminance was less than 90%.

(3) Front Coloration

The liquid crystal display devices of the examples and the comparative example were observed from the normal direction, and a display image was displayed. Five reviewers evaluated, by the following criteria, whether or not coloration gave a relative sense of incongruity in narrow viewing angle mode in comparison with wide viewing angle mode when the liquid crystal panel was switched between wide viewing angle mode and narrow viewing angle mode. The display image was a color landscape image.

○: Four or five reviewers out of the five did not recognize difference in coloration between wide viewing angle mode and narrow viewing angle mode.

Δ: Two or three reviewers out of the five did not recognize difference in coloration between wide viewing angle mode and narrow viewing angle mode.

x: Zero or one reviewer out of the five did not recognize difference in coloration between wide viewing angle mode and narrow viewing angle mode.

TABLE 2

| | Type of Gamma Correction Table | | Performance in Narrow Viewing Angle Mode | | |
|---|---|---|---|---|---|
| | Wide Viewing Angle Mode | Narrow Viewing Angle Mode | Visibility From Oblique Direction | Front Luminance | Front Coloration |
| Comparative Example 1 | Table 1 (γ = 2.2) | | 1 point | x (75%) | x |
| Example 1 | Table 1 (γ = 2.2) | Table 2 (γ = 2.2) | 1 point | ○ (95%) | ○ |
| Example 2 | Table 1 (γ = 2.2) | Table 3 (γ = 1.8) | 3 points | ○ (95%) | Δ |
| Example 3 | Table 1 (γ = 2.2) | Table 4 (γ = 2.0) | 2 points | ○ (95%) | ○ |
| Example 4 | Table 1 (γ = 2.2) | Table 5 (see Table 1) | 3 points | ○ (95%) | Δ |
| Example 5 | Table 1 (γ = 2.2) | Table 6 (see Table 1) | 2 points | ○ (95%) | ○ |
| Example 6 | Table 1 (γ = 2.2) | Table 7 (see Table 1) | 3 points | ○ (95%) | Δ |
| Example 7 | Table 1 (γ = 2.2) | Table 8 (see Table 1) | 2 points | ○ (95%) | ○ |

What is claimed is:

1. A liquid crystal display device comprising:

a liquid crystal panel; and a control unit configured to drive the liquid crystal panel, wherein the liquid crystal panel includes a first substrate, a liquid crystal layer, and a second substrate, all of which are provided in this stated order, the first substrate includes a first electrode and a second electrode either stacked via a first insulating layer or disposed opposite each other, the second substrate includes a third electrode, the control unit includes a display mode switching unit, a gamma correction table memory unit, a gamma correction unit, and an image data output unit, the display mode switching unit switches between a narrow viewing angle mode and a wide viewing angle mode by controlling a voltage applied to the third electrode, the gamma correction table memory unit contains gamma correction tables through each of which a gray level is associated with an application voltage to the first electrode and/or the second electrode, the gamma correction unit acquires different gamma correction tables from the gamma correction table memory unit for the narrow viewing angle mode and for the wide viewing angle mode, performs a gamma correction on original image data based on each of the acquired gamma correction tables, and outputs resultant gamma-corrected image data to the image data output unit, the image data output unit outputs a liquid crystal panel drive signal to the liquid crystal panel and adjusts the application voltage to the first electrode and/or the second electrode, a first gamma correction table, among the gamma correction tables, is used in the wide viewing angle mode and contains a gamma value that is constant between gray levels 0 to 255, a second gamma correction table, among the gamma correction tables, is used in the narrow viewing angle mode and contains a gamma value that has a plurality of values between the gray levels 0 to 255, and having X as an arbitrary gray level between the gray levels 0 to 255 both exclusive, the gamma value in the second gamma correction table is smaller than the gamma value in the first gamma correction table at gray levels from 0 inclusive to X exclusive, and the gamma value in the second gamma correction table is greater than the gamma value in the first gamma correction table at gray levels from X to 255 both inclusive.

2. The liquid crystal display device according to claim 1, wherein the second gamma correction table contains a first gamma value, and the first gamma correction table contains a second gamma value, the first gamma value is different from the second gamma value by less than or equal to 0.4.

3. The liquid crystal display device according to claim 1, wherein at least one of the first electrode and the second electrode is provided in each picture element and includes a linear electrode section extending in a first direction, and the third electrode includes a linear electrode section extending in a second direction that intersects with the first direction in a plan view.

4. A liquid crystal display device comprising:

a liquid crystal panel; and a control unit configured to drive the liquid crystal panel, wherein the liquid crystal panel includes a first substrate, a liquid crystal layer, and a second substrate, all of which are provided in this stated order, the first substrate includes a first electrode and a second electrode either stacked via a first insulating layer or disposed opposite each other, the second substrate includes a third electrode, the control unit includes a display mode switching unit, a gamma correction table memory unit, a gamma correction unit, and an image data output unit, the display mode switching unit switches between a narrow viewing angle mode and a wide viewing angle mode by controlling a voltage applied to the third electrode, the gamma correction table memory unit contains gamma correction tables through each of which a gray level is associated with an application voltage to the first electrode and/or the second electrode, the gamma correction unit acquires different gamma correction tables from the gamma correction table memory unit for the narrow viewing angle mode and for the wide viewing angle mode, performs a gamma correction on original image data based on each of the acquired gamma correction tables, and outputs resultant gamma-corrected image data to the image data output unit, the image data output unit outputs a liquid crystal panel drive signal to the liquid crystal panel and adjusts the application voltage to the first electrode and/or the second electrode, a first gamma correction table, among the gamma correction tables, is used in the wide viewing angle mode and contains a gamma value that is constant between gray levels 0 to 255, a second gamma correction table, among the gamma correction tables, is used in the narrow viewing angle mode and contains a gamma value that has a plurality of values between the gray levels 0 to 255, and having X as an arbitrary gray level from the gray levels 0 to 255 both exclusive, and Y as an arbitrary gray level higher than X, the gamma value in the second gamma correction table is smaller than the gamma value in the first gamma correction table at gray levels from 0 inclusive to X exclusive, and the gamma value in the second gamma correction table is greater than the gamma value in the first gamma correction table at gray levels from Y to 255 both inclusive.

* * * * *